United States Patent [19]

Martin

[11] 4,289,812
[45] Sep. 15, 1981

[54] METHOD OF WATER-SOLUBILIZING HIGH PERFORMANCE POLYETHER EPOXIDE RESINS, THE SOLUBILIZED RESINS AND THERMOSET, HYDROPHOBIC COATINGS DERIVED THEREFROM

[75] Inventor: Patrick H. Martin, Danville, Calif.

[73] Assignee: The Dow Chemical Company, Midland, Mich.

[21] Appl. No.: 19,958

[22] Filed: Mar. 12, 1979

Related U.S. Application Data

[63] Continuation-in-part of Ser. No. 853,168, Nov. 21, 1977, abandoned, which is a continuation-in-part of Ser. No. 753,765, Dec. 23, 1976, abandoned.

[51] Int. Cl.$^3$ .................. B05D 3/02; C08L 63/00
[52] U.S. Cl. .................. 427/379; 260/29.2 EP; 260/30.4 EP; 260/32.8 EP; 427/388.2; 427/388.4; 427/386; 428/418; 525/523; 525/524; 525/527; 528/99; 528/101; 528/102; 528/105; 528/108
[58] Field of Search .............. 528/108, 105, 99, 101, 528/102; 427/386, 379

[56] References Cited

U.S. PATENT DOCUMENTS

| | | | |
|---|---|---|---|
| 2,541,027 | 2/1951 | Bradley | 148/6.15 |
| 2,723,971 | 11/1955 | Cupery et al. | 260/85.7 |
| 4,059,550 | 11/1977 | Shimp | 260/29.4 R |

*Primary Examiner*—Theodore E. Pertilla
*Attorney, Agent, or Firm*—R. R. Stringham

[57] ABSTRACT

Hydrophobic, thermoset resins having highly desirable properties in coatings applications can be prepared from novel, water-thinnable, base-neutralized, acidic reaction products of orthophosphoric acid with hydrophobic, nominally-difunctional polyether epoxide resins having average epoxide equivalent weights (EEW) of from about 172 to about 5500. The phosphate groups in these products, when formed with fugitive bases, are thermally decomposable to yield resins which are not rapidly self-converting as such but are rapidly heat convertible in admixture with any of several types of curing agents. The functional groups responsible for water solubilization are utilized (and reacted out) in curing of the resins. The invention provides a method of utilizing hydrophobic, high performance polyether epoxide type polymers in aqueous coating systems having the ability to wet metal surfaces.

34 Claims, No Drawings

METHOD OF WATER-SOLUBILIZING HIGH PERFORMANCE POLYETHER EPOXIDE RESINS, THE SOLUBILIZED RESINS AND THERMOSET, HYDROPHOBIC COATINGS DERIVED THEREFROM

CROSS-REFERENCE TO RELATED APPLICATION

The present application is a continuation-in-part of a co-pending application, Ser. No. 853,168, filed Nov. 21, 1977, abandoned, as a continuation-in-part of a then co-pending application, Ser. No. 753,765, filed Dec. 23, 1976, the latter now being abandoned.

BACKGROUND OF THE INVENTION

Very large amounts of synthetic resins are employed as protective coatings on metals. A high proportion of the resins consumed for this purpose are applied to metal surfaces as solutions in non-aqueous solvents which are subsequently evaporated. Pollution of the atmosphere with the resulting vapors is highly undesirable and their recovery or combustion is a very expensive alternative. Consequently, methods of resin application which do not require the evaporation of large amounts of such solvents are being sought. A particularly attractive such method is to apply the resin as a solution or dispersion in water, a solvent which does not have to be recovered or burned after it is evaporated off.

It has been found particularly difficult to provide aqueous coating resin systems which can meet the requirements for suitable linings in food and beverage cans. Such linings function to chemically insulate the can and its contents from each other. The lining resin frequently is applied to the can metal as a thin layer and cured before the metal is fabricated into a can. Thus, to be suitable as a can lining material utilized in this manner, the cured resin not only must be inert and impervious to the contents of the can but also must be able to adhere to the metal and to retain its integrity under the conditions involved in can fabrication and in cooking, pasturization, etc., of the contents. Additionally, the lining material must not have any substantial toxicity and must not impart any objectionable taste or odor to the can contents.

Several types of resins which meet all of the foregoing requirements and are soluble (before curing) in non-aqueous solvents have been developed. The difficulty in utilizing such resins as aqueous systems is that the structural parameters which are essential to the required properties of the cured resins apparently would have to be altered in order to attain water dispersability. That is, the cured resin must be essentially hydrophobic, or at least not water-sensitive, but the uncured resin must comprise hydrophilic functional groups.

A particular group of resins which have proven to be excellent for can lining (and other coating) applications are nominally-difunctional, epoxide terminated, linear polymeric adducts of bis-phenols with their diglycidyl ethers. Curing agents conventionally employed with these resins are exemplified by condensation products of formaldehyde with ureas, phenols or triazines. The resin and curing agent are dissolved in an organic solvent, such as xylene, lower ketones, higher alcohols or glycol ethers, together with catalysts, accelerators, etc., and then applied to the metal substrate and baked.

The most widely used resins of the foregoing type are DGEBA (diglycidyl ether/bis-phenol-A) resins, i.e., polyether diepoxides derivable from the polymeric adduction of bisphenol-A

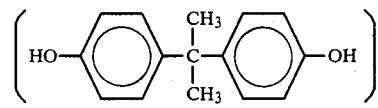

with the diglycidyl ether of of bisphenol-A

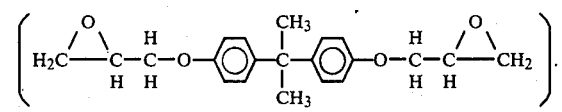

The diglycidyl ether may be performed by reacting two molecules of epichlorohydrin with one molecule of the bisphenol-A in the presence of a base, such as sodium hydroxide. Classically, however, the latter reaction is carried out in such a manner that the resulting di-ether molecules react in-situ with bisphenol molecules to produce the DGEBA resin.

In the latter case, the reaction product tends to be a mixture consisting predominantly of polymeric species of different molecular weights corresponding to different values of n in the following idealized formula:

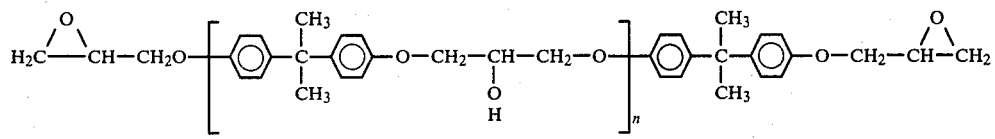

By reason of including some monofunctional epoxide species, such mixtures exhibit average epoxide functionalities of somewhat less than two.

In order to impart satisfactory properties, for can lining applications, to cured resins of the DGEBA type it is generally considered that the average molecular weight of the uncured resin must be within the range of from about 2,000 to 10,000 (n=6–34). Optimum properties are generally obtained at an average molecular weight of about 4000 (n= ~ 12–14). Despite the formation of a secondary alcoholic hydroxyl group for each epoxide (oxirane) ring reacted in the polymerization, the extent to which these resins can be dispersed in water drops off very rapidly as their molecular weights go up. Thus, even at n values as low as 0 (mol. wt. about 340), the preceding resins are not directly water-thinnable and must be emulsified in order to be dispersed in water. Such emulsions are not easily prepared and often do not readily yield coatings as good as those obtained from non-aqueous solutions of the same resins.

According to U.S. Pat. No. 2,541,027, resins of the preceding type, when mixed with phosphoric acid, applied to a metal substrate and heated (or allowed to stand several days), cure to coatings which adhere strongly to the metal, have high chemical resistance and are flexible, hard and tough. The cured resins are said to be particularly useful as primer coatings on ferruginous metals.

The '027 patent does not disclose water-dispersible products as being formed from the reactions of epoxides with phosphoric acid and, in fact, it has not been found possible to render DGEBA resins having average n values substantially higher than about 0 directly water-thinnable, simply by reacting them with phosphoric acid.

Water-thinnable, thermosetting resin systems are known in the coatings industry. For example, "alkyd" type polyester resins are made water soluble by neutralizing residual carboxylic acid groups attached to the polymer backbone with suitable amines. The same method has been used to solubilize other types of polyester resins and certain esters produced by the condensation of epoxy resins with dimeric fatty acids. However, the foregoing water-thinnable systems have not found commercial employment in such coatings applications as can lining.

U.S. Pat. No. 2,723,971 discloses coating compositions made by reacting phosphoric acid with the epoxide groups of copolymers of ethylenically unsaturated epoxy monomers and ethylenically unsaturated, acyclic epoxy-free monomers, the polymerization being of the free radical initiated, addition type. Depending on the nature and proportions of the component monomers in the copolymers and on the relative amounts of

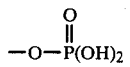

in the reaction products with phosphoric acid, the resultant coating composition may be soluble in aqueous alkaline solutions. That is, some of the disclosed compositions are water soluble as such or may be rendered water soluble by neutralizing the diacid phosphate moieties they contain with amines, ammonia or other inorganic bases. An oxirane oxygen content in the copolymer of at least 3.9 wt. % (an average epoxide equivalent weight of 410 or less) is said to be required to render the phosphated product alkali-soluble, although fewer neutralized acid phosphate groups are said to be required when other water-solubilizing groups, such as acyloxy or beta-methoxyethyl acrylate moieties are present. Typical unsaturated epoxy monomers employed in the compositions of the '971 patent are allyl glycidyl ether and glycidyl methacrylate.

The coating compositions disclosed in the '971 patent are cured by air drying or heating, presumably as a result of oxidative cross-linking between double bonds.

The alkali-insoluble compositions of the '971 patent are taught as being preferred, by reason of having the best combination of properties, particularly for coating applications. Further, the '971 patent teaches, in effect, that copolymers of the type disclosed provide for the combination of a high molecular weight with a sufficient oxirane content to ensure that the neutralized reaction point with phosphoric acid will be water soluble, but that this combination cannot be obtained with epoxide-containing polymeric ethers.

U.S. Pat. No. 3,975,346 teaches the DGEBA resins can be converted to water-dispersable coating resins by reaction with quaternary ammonium salts of acids, including phosphoric acid. However, the presence of boron (as boric acid, for example) is said to be essential to adequate cured coating (film) properties. Furthermore, the epoxide groups in the DGEBA resin are reacted with the amine components of the quaternary salt (as such or prior to salt formation) and no epoxide/acid reactions appear to be involved. Also, the cured coatings are not indicated to be water resistant. An additional consideration is that the disclosed coatings, containing up to 8% boron (which is toxic), would not be acceptable as can linings. The only relationship between EEW and water-dispersibility disclosed in the '346 patent is that which may be inferred from a teaching that the resin preferably contains at least about 0.05 percent by weight of nitrogen in the form of chemically bound quaternary ammonium base salt groups. (On the basis of one nitrogen per oxirane group originally present, this is equivalent to a maximum EEW of about 280–14, or ~266.)

It thus does not appear that a way to effectively render DGEBA type resins water-thinnable without introducing water sensitivity and/or toxicity in the cured resin has been provided by the prior art.

OBJECTS OF THE INVENTION

A principal object of the invention is to provide water-thinnable compositions derived from resins formable by adductive polymerization of bisphenols (including polyhydroxy benzenes) with diglycidyl ethers of bisphenols, said compositions being readily convertible to water-insensitive, high performance, thermoset coatings capable of meeting the several other requirements for can linings (including negligible contents of water extractable materials).

An additional object is to provide water-thinned products of the preceding type which are readily altered, in situ, to materials which are heat convertible to thermoset resins. A corollary object is to provide a novel method of making such water-thinned products and the cured resins derived therefrom.

An additional object is to provide water-thinned, neutralized, $H_3PO_4$/DGEBA resin reaction products with which DGEBA resins (as such) having EEW's up to about 13,000 are compatible.

Still another object is to provide a method of improving the water-dispersibility of DGEBA type resins which are of low enough molecular weight to be water-dispersible (with the aid of conventional dispersing agents) by converting them to their neutralized reaction products with phosphoric acid.

A further object is to very substantially reduce the amounts of organic solvents which must be employed to prepare coatings from DGEBA type resins.

Other objects will be apparent to those skilled in the art.

SUMMARY OF THE INVENTION

The present invention embraces an efficient method for converting polyether epoxides (and DGEBA-type epoxides in particular) to water-thinnable resins which are readily convertible to high performance, water-insensitive, thermoset coatings. The product resins, as such, as water-thinned dispersions (which optionally may be formulated with co-solvents) and as the cured end-products derived therefrom are also within the ambit of the invention.

It has now been found that hydrophobic or not readily water-dispersible polyglycidyl ether epoxide resins, such as the copolymeric adducts of bisphenols and diglycidyl ethers of the same or different bisphenols, having average EEW's of up to about 5500, can be made water-thinnable by reacting them with (even low proportions of) phosphoric acid and then neutralizing the resulting, acidic, ester and glycol-comprising reaction products with a base. If the base is a fugitive base, such as ammonia or a volatile amine, the water-thinned, neutralized resin can be converted to a water-insensitive, high performance, thermoset resin by evaporating the water, heating to disrupt the ammonium salt groups and drive off the ammonia (or amine) and curing. Conventional curing agents capable of reacting with acidic and/or alcoholic hydroxyl groups may be incorporated with the uncured resin.

In the preceding paragraph, and hereinafter, the term "volatile" means removable, by heating at ambient pressures, to such an extent as not to have an intolerably detrimental effect upon the rate of curing or on the properties of the cured resin.

The ammonia (or amine) driven off during or subsequent to evaporation of water from the uncured resin usually will be small in amount and can readily be recovered as such or as a non-volatile acid salt, by known methods.

More precisely, the method of the present invention may be defined as a process for making water-thinnable, base-neutralized, acidic resins which are convertible to hydrophobic, high performance, thermoset resins, said process comprising:

(I) reacting orthophosphoric acid with
  (1) a polyether epoxide resin $E^1$ consisting essentially of molecules of the formula $R^5$ is H or alkyl of 1 to 12 carbons,
  said reaction being carried out by contacting $E^1$ with an orthophosphoric acid source material and from 0 to about 26 molecular proportions of water per molecular proportion of $H_3PO_4$ provided by said source material, until the fraction of the oxirane groups in $E^1$ converted is at least sufficient to render the resulting product water-thinnable when contacted with a base,
  the amount of orthophosphoric acid included as such in said source material, or obtainable therefrom by hydrolysis, being such as to provide about 0.3 or more acidic (P—OH) hydroxyl groups per oxirane group, and (II) contacting the resultant reaction product with at least sufficient of a base to render it water-thinnable.

A reaction medium is not necessarily required. Preferably, however, the epoxide(s) and the acid are contacted with each other as components of a solution in an inert solvent, the solvent being removed after water and base are added to the final reaction mixture. If desired, any free phosphoric acid present in the final adduction mixture may be removed (as by extraction with water) before neutralization. The neutralized and stripped resinous product dispersion may promptly be water-thinned and used or may be stored—as such or after water-thinning—for later use.

As employed herein, the term "water-thinnable" means that the product so designated forms an essentially homogeneous solution or dispersion, upon being diluted with a substantial proportion of water, and the resulting dispersed product does not "settle out" or

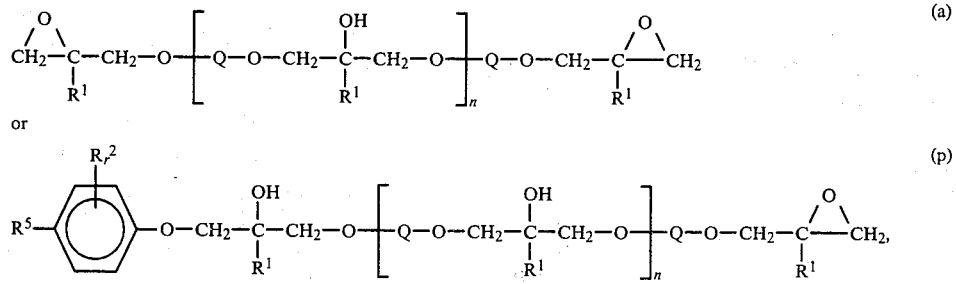

wherein
Q, independently, in each occurrence, is

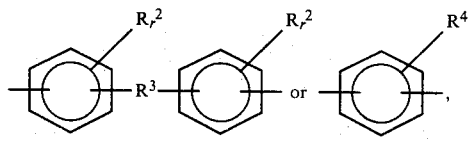

n is an integer of from 0 to 40, r is zero, 1 or 2 and, independently in each occurrence;
$R^1$ is H, methyl or ethyl,
$R^2$ is —Br, —Cl or a $C_1$ to $C_4$ alkyl or alkenyl group,
$R^3$ is a $C_1$-$C_4$ alkylene or alkenylene group, >C(CF_3)_2, —CO—, —SO_2—, —S—, —O— or a valence bond,
$R^4$ is —Br, —Cl or a $C_1$ to $C_4$ alkyl or alkenyl group; and otherwise detrimentally alter at such a high rate that the dispersion is impracticable for use as a coating. This of course does not require the absence of solvents in each stage of dispersion formation, but it does mean that the final, water-thinned dispersion does not have to include a solvent (a co-solvent, more particularly) in order to meet the foregoing stability requirement. That is, inclusion of a co-solvent is optional.

Preferably $E^1$ is an epoxide in which Q, in all occurrences, is

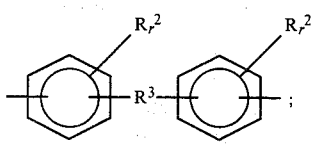

i.e., $E^1$ preferably is a nominally difunctional epoxide of the formula

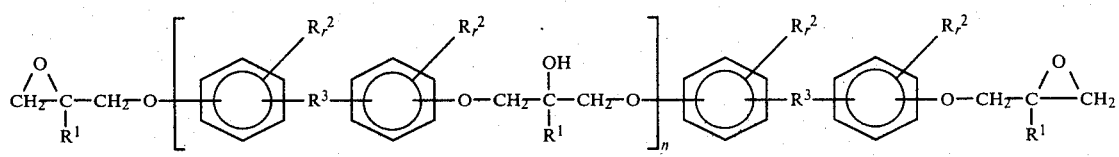

or a nominally monofunctional epoxide derivable therefrom by 1:1 adduction with a phenol of the formula

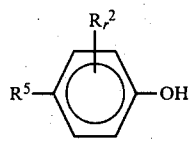

wherein $R^2$, r and $R^5$ are as above defined.

Particularly preferred are $E^1$ epoxides of the foregoing formulas in which Q, in essentially all occurrences, is either

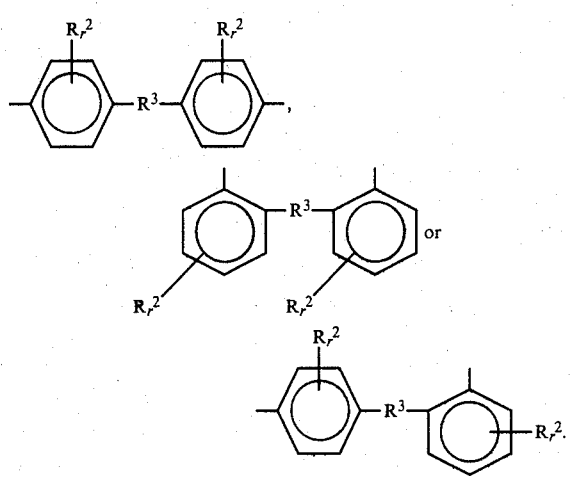

Most preferred are $E^1$ epoxides in which Q, is essentially all occurrences, is

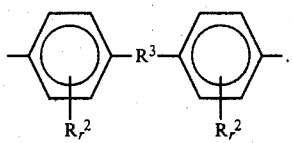

Preferably, the amount of free acid present in the reaction product is limited by charging to the reaction not more than the amount of $H_3PO_4$ required to provide 3 acidic hydroxyls per oxirane.

In one aspect, the composition of the present invention is a solution of a resinous reaction product of phosphoric acid and a polyether epoxide of formula (a) or (p), which—when neutralized, diluted with water and stripped of solvents—will form an aqueous dispersion.

In another aspect, the invention is the water-thinnable composition found upon contacting the resinous reaction product, as above defined, with a base.

Aqueous dispersions of the preceding base-neutralized products constitute a preferred form of the composition of the invention.

The neutralized reaction product of the present invention may be defined as a water-thinnable, resinous phosphate composition which comprises, and preferably consists essentially of:

(A) resin molecules, each of which is deriveable by conversion to 1,2-glycol- or to beta-hydroxy phosphomonoester groups of the oxirane groups in an epoxide represented by either of the preceding formulas (a) and (p), the number ratio of glycol to monoester groups in said molecules being within the range of from 0 to about 12, and the average EEW of the epoxide molecules from which said resin molecules are derivable being within the range of from about 172 to about 5500, (B) from 0 to 85 parts by weight of free ortho phosphoric acid ($H_3PO_4$) per 100 parts by weight of said resin molecules, and (C) a base, in such amount that at least enough of the P-OH moieties in said resin molecules are salified thereby to render said reaction product dispersible in water, said number ratio of glycol to monoester groups and the amount of said free phosphoric acid being such that if the neutralized reaction product is diluted with water, an aqueous dispersion of said resin molecules results.

Ordinarily, dispersion is accomplished by adding the water to a solution of the unneutralized reaction product in a solvent (or solvent mixture), adding the base and then stripping off the solvent(s) while stirring the resulting mixture.

The following embodiments of the invention are most preferred as having particular merit for coating applications.

(1) The product of the foregoing process wherein $E^1$ is a diglycidyl ether, as defined in formula (a) above, derivable from adductive polymerization of bis-phenol-A with a diglycidyl ether of bis-phenol-A, i.e., wherein $R^3$ is

and r is zero.

(2) A product of embodiment (1) which has been made water-thinnable by neutralization with ammonia or an amine;

(3) The neutralized product of embodiment (2) when thinned with water to a resin content of 50 wt. % or less.

(4) A thermoset resin coating prepared from the water-thinned product of embodiment (3).

(5) The product of the foregoing broadly defined process wherein $E^1$ has an EEW of less than about 3200.

(6) The embodiment of the foregoing broadly defined process in which the overall ratio of acidic (P—OH) hydroxyls to oxirane groups is within the range of from about 0.4 to about 1.0.

(7) The embodiment of the foregoing process in which the amount of $H_3PO_4$ provided to the reaction is within the range of from about 0.5 to about 1 part by weight per 100 parts of $E^1$.

(8) The embodiment of the foregoing broadly defined process wherein the phosphoric acid is charged to the reaction as about 70 to about 90 wt. %, aqueous, $H_3PO_4$.

The cured resin of embodiment (4) above may be derived from an aqueous composition of the invention in which the water-thinned, neutralized epoxide/$H_3PO_4$ reaction product is the sole resinous component or from similar compositions in which other water-dispersible resins, reactive diluents and/or curing agents are also present. In either case, curing may be catalyzed by such known agencies as chemicals, ultrasonic vibrations, heat, high energy wave or particle radiation, etc.

DETAILED DESCRIPTION

The $E^1$ type of epoxides represented by formula (a) may all be described as resins. A few of the lower epoxides, such as the diglycidyl ether of bisphenol-A, are available as pure, crystalline solids. However, most DGEBA-type epoxies are not ordinarily available as pure compounds, as a consequence of the practical methods employed in their manufacture. Thus, DER-331 ®, a less expensive form of the diglycidyl ether of bisphenol-A, is prepared through a two-step reaction of epichlorohydrin with bisphenol-A. The product of this reaction includes not only the desired diether but also (in minor amounts) by-products such as

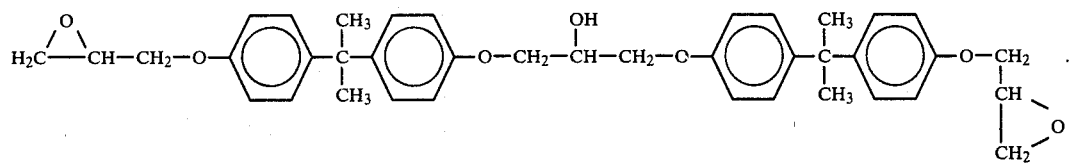

The presence of such impurities, of the types and in the amounts ordinarily present have no substantial deleterious effect in the products of the present invention.

Any of the epoxides of formula (a) having an EEW of less than about 5500 can be prereacted with a phenol (as above defined), in such amount as to convert that epoxide to a resin having an EEW not in excess of 5500 and comprising a corresponding proportion of product molecules representably by formula (p).

The epoxide equivalent weights given subsequently in the examples herein for DGEBA type epoxides are generally somewhat higher than the theoretical values for the nominal compounds, for the reasons explained above.

The practice of the present invention is not restricted to the use of one type of $E^1$ epoxide at a time or to such epoxides in which all $R^1$, $R^2$, $R^3$, $R^4$ or $R^5$ groups are the same throughout the molecule. The $E^1$ epoxide reactant may comprise two or more such epoxides of different epoxide equivalent weights. Similarly, a given $E^1$ epoxide may comprise as many different kinds of $R^1$ groups (H, —$CH_3$ or —$C_2H_5$), $R^2$ or $R^4$ groups (—Br, —Cl or —$CH_3$) and $R^3$ groups ($C_1$-$C_4$ alkyl or alkylene, —$SO_2$— or —O—) as it is synthetically feasible to incorporate in individual molecules of the formula in the foregoing broad definition of the invention.

Thus, for example, polyether diepoxides may be formed by using a mixture of epichlorohydrin and methylepichlorohydrin in place of either chlorohydrin alone, in well known methods of synthesis, such as are described in *Handbook of Epoxy Resins*; (ch 2) Lee and Neville; McGraw-Hill, (1967). Similarly, mixtures of different bisphenols may be employed in well known procedures for reacting an individual bisphenol with an epichlorohydrin or with a diglycidyl ether of the same or a different bisphenol.

Few, if any, commercially available DGEBA-type resins are derived from bisphenols other than bisphenol-A (as such, or substituted with bromine or chlorine) or from chlorohydrins other than epichlorohydrin itself. That is, the commercially available DGEBA-type resins are those of the preceding general formula for $E^1$ in which $R^1$ is H, r is either 0 or is 2 and $R^2$ is Br or Cl, and $R^3$ is $(CH_3)_2C<$. Exemplary of such commercial DGEBA resins, which are preferred for the practice of the present invention, are those (except DER ®-684; see Example 14 herein) listed in Table A following.

TABLE A

| Value of n Designation[4] | Theoretical Corresponding to $M^3 = 2 \times EEW$ | or EEW[1] | Viscosity; cps @25° C. (Duran m.p.) °C. |
|---|---|---|---|
| DER ®  -332 | 0 | 172–6 | 4000–5000 |
| -331 | 0 | 186–92 | 11000–14000 |
| -542[2] | 0 | 330–80 | (51–61°) |
| -337 | ~0.5 | 230–50 | semi-solid |
| -660 | ~2 | 425–75 | (65–74) |
| -661 | 2–3 | 475–575 | (70–80) |
| -662 | 3–4 | 575–700 | (80–90) |
| -664 | 5–6 | 875–975 | (95–105) |
| -667 | 10–13 | 1600–2000 | (113–123) |
| -668 | 13–23 | 2000–3500 | (120–140) |
| -669 | 23–38 | 3500–5500 | (135–155) |
| -684 | ~90 | ~13,000 | — |

Notes:
[1]Epoxide Equivalent Wt.
[2]Prepared from tetrabromo-bisphenol-A
[3]Molecular Weight
[4]By The Dow Chemical Company The epoxide functionality of DGEBA resins is generally less than the theoretical value of 2 and the actual values of n for the resins listed above would be lower than the theoretical values calculated for molecular weights equal to twice the EEW's given.

According to Lee & Neville (loc cit), a typical DGEBA resin having an EEW of about 190 (theoretical value of n=0) has been found to consist about 88% of molecules in which n=0, 10% of n=1 and 2% of n=2. Similarly, a typical higher molecular weight DGEBA resin, such as is used in some solution coatings and having an EEW of about 540 (theoretical value of n=2) was found to have the following compositions: >50% of n=3–5; about 15% of n=2; 15% of n=1, and 20% of n=4.

Exemplary bisphenols from which $E^1$ epoxides of the general formula (a) given earlier herein may be prepared, are as follows:

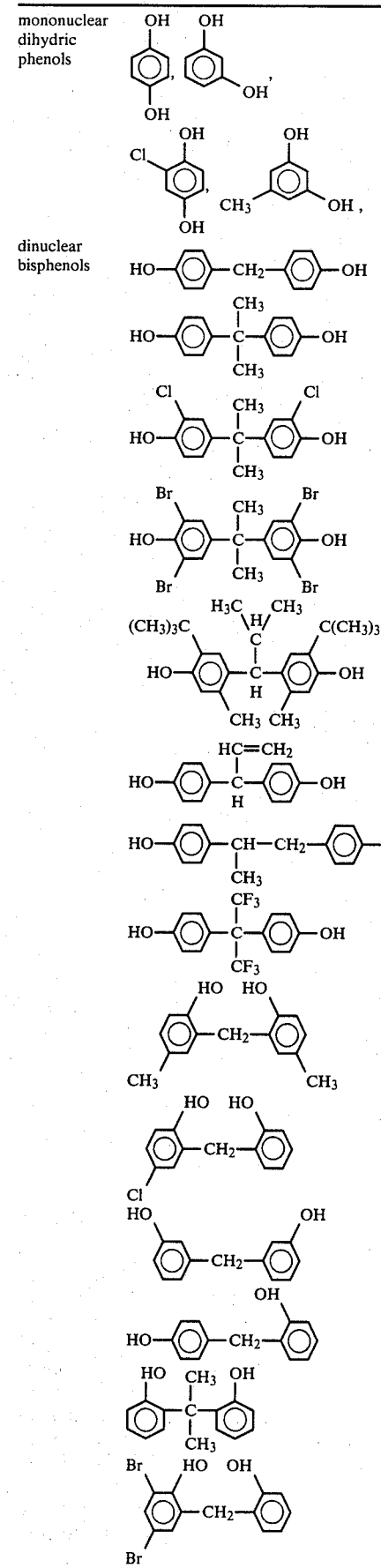
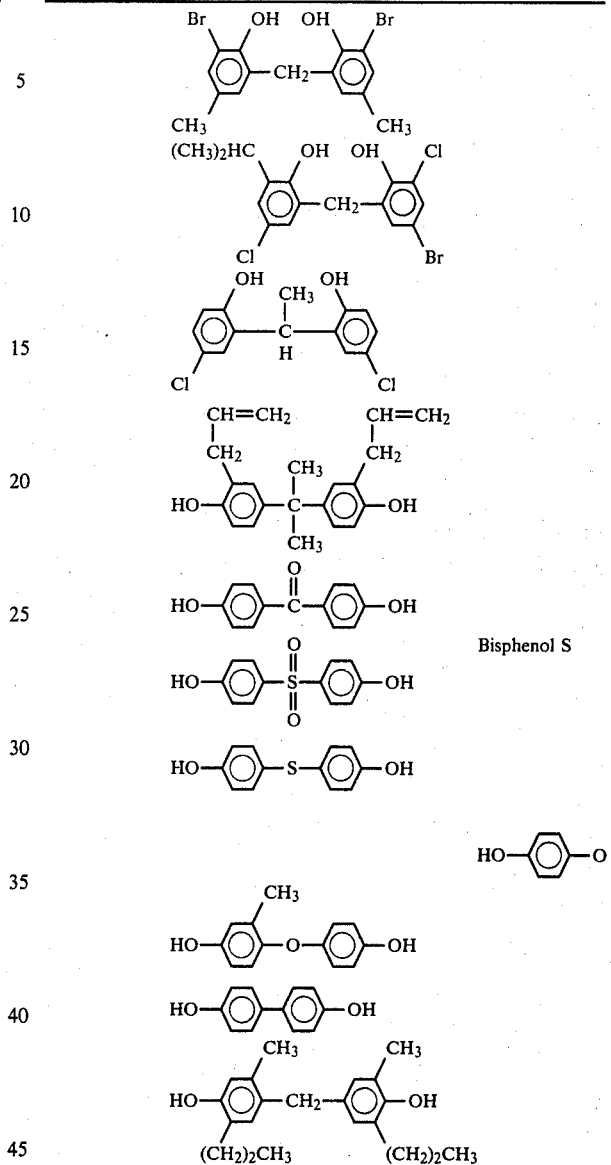

Additional exemplary bisphenols will be found in Tables I and II: *The Chemistry of Phenolic Resins;* R. W. Martin; pp. 64–79, Wiley & Sons; N.Y., N.Y., (1956).

$E^1$ epoxides of the type represents by formula (p) may readily be prepared by "capping" corresponding epoxides of formula (a), with one or more phenols

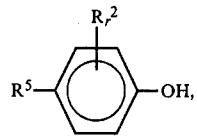

$R^2$, r and $R^5$ being as defined earlier herein, in a manner familiar to those skilled in the epoxy resin art. It has been found that the wetting ability of the resin can be varied in this manner to ensure better wetting on a given type of substrate.

It will of course be recognized that formula (p) will only be representative of the capped product as an "average" structure. That is, even if the phenol and type (a)

epoxide are reacted in equimolar proportions, some of the product molecules will not be capped and others will have had both oxiranes reacted out. The epoxide and the phenol can be reacted in other than 1 to 1 ratio, so long as the EEW of the product is not raised above about 5500.

Phosphoric acid source materials which may be employed in the practice of the present invention include 100% orthophosphoric acid, the semi-hydrate $2H_3PO_4 \cdot H_2O$ and aqueous solutions containing at least about 18 wt. % $H_3PO_4$ (~1 mole $H_3PO_4$ per 25 moles of water). The various condensed forms (polymeric, particle anhydrides) of phosphoric acid, pyrophosphoric acid and triphosphoric acid may also be used.

When the acid source material is of the condensed type, sufficient water should be supplied, at some stage prior to curing the resinous end-product, to ensure that no substantial proportion of P—O—P links are left in the cured resin.

Ordinarily, aqueous phosphoric acid solutions, particularly about 70–90% solutions, will be preferred. When a condensed form of phosphoric acid is utilized as the source material, the stage in the process at which P—O—P hydrolysis is effected will depend on whether or not minimization of water content during the reaction is desired. If a condensed source material is to be fully utilized as $H_3PO_4$ in the reaction, sufficient time should be allowed for complete P—O—P hydrolysis to occur.

Reaction Parameters

The rate at which the oxirane groups are converted in the $E^1/H_3PO_4$ reaction and the makeup of the products obtained are of course dependent on such parameters as water to acid ratio, acid to oxirane ratio, solvent nature, temperature and contact time.

It has been found that the reaction generally involves more than just adduction of P—OH with oxirane groups. Unless pains are taken to ensure the absence of water in the reaction mixture, the product will generally include substantial proportions of molecules in which at least one oxirane group has been converted to an alpha, beta-dihydroxy group, i.e., a "glycol" group. This apparently results primarily from phosphoester group hydrolysis and to a lesser extent, from ($H^+$-catalyzed) adduction of water with oxiranes. As a consequence of the latter reactions, some free phosphoric acid will generally be present in the equilibrated reaction product, even when the amount of acid used is such as to provide substantially less than one P-OH per oxirane group.

It is apparent that the presence of water has a more profound effect on the composition of epoxide/$H_3PO_4$ reaction products than has heretofore been realized.

Introduction of water to the reaction mixture may be avoided by use of 100% phosphoric acid as the sole acid source material. However, it has been found that esterification of the secondary alcoholic hydroxyl groups in DGEBA type epoxides tends to occur to a minor extent. Since water is also produced by this reaction, steps must be taken to scavenge or remove any evolved water if attainment of really low glycol to ester group ratios in the product is desired. This is most readily done by employing some P—O—P group-containing acid source material (such as pyrophosphoric acid or polyphosphoric acid) with the 100% acid. Esterification of alcoholic hydroxyls (and water production) is also minimized by carrying out the reaction at relatively low temperatures (such as about 60°–80° C.).

If desired, a suitable P—O—P group-containing acid source material for the latter purpose can be made simply by in-situ, pre-reaction of pyrophosphoric acid with less than the amount of water required to react out all of the P—O—P groups.

Although the presence of (salified) phosphomonoester groups is essential to water-thinnability of the $E^1/H_3PO_4$ reaction product, it is not necessary that a high proportion of the oxirane groups in $E^1$ report in the product as ester groups, rather than as glycol groups. On the contrary, "esterification" products of DER ®-667 in which the number ratio of glycol to ester groups is as high as about 10 to 1 have been found to be water-thinnable and to yield useful coatings when cured. (See Example 20 herein.) The foregoing finding constitutes a most unexpected and surprising discovery and has important consequences to the suitability of the composition of the present invention as linings for food containers. One consequence is that the phosphoric acid (and the salifying base) can be used in such minor amounts (as little as 0.75 grams of $H_3PO_4$ per hundred grams of DER ®-667, for example) that a cured product having excellent resistance to steam can be obtained at a cost substantially less than it would otherwise be. Another consequence is that when a fugitive base is employed, the amount of the base evolved prior to (or during) curing is so small that the problem of recovery is correspondingly reduced. A further, very important consequence is that the amount of the (fugitive) base retained in the cured coatings is essentially nil (within the range of from about 50 parts per billion down to undetectable amounts).

The amount of water provided to the acid/epoxide reaction can vary from 0 to about 26 molecules or more per molecule of $H_3PO_4$ provided by the acid source material. Amounts of water in excess of about 2–4 moles per mole of the acid will generally result in an inhomogeneous reaction mixture unless a good solvent for water is included therein. Example 17 (paragraph 1) is of interest in this regard. The presence of water in relatively high proportions does not necessarily result in as high glycol to phosphoester group ratios in the reaction product as might be expected. Glycol to ester ratios as low as about 2.3 have been obtained (using DER ®-667 as the epoxide and acetone as the reaction medium) at water to acid mole ratios in the vicinity of about 22 to 1. (Table 18, Example 17).

An effect of initial water content in the reaction mixture on particle size in dispersions derived from 1587 and 1746 EEW DGEBA resins and 1 phr $H_3PO_4$ is apparent (Table 19, Example 17) for water contents within the range of 0–5 wt. % (of total volatiles, including the water). For the reaction of such resins with 1 phr of phosphoric acid, water contents in the range of about 0.3 to about 2.0% are preferred; water contents in the range of about 0.5–1.8% being particularly preferred.

In general, the effect of water in the early stages of the reaction is not very great; the oxirane/acid reaction is substantially faster than the oxirane/water reaction. However, hydrolysis of ester—particularly of diester—groups becomes increasingly important as the reaction proceeds and the effect of water on the equilibrium composition of the product is substantial, as shown by several of the Examples herein.

The product resins will generally be water-thinned and it is usually preferable to have water present in the mixture before the solvent is removed. Accordingly, the presence of relatively large amounts of water during the reaction does not pose any large problem on these accounts. It has been found that prolonged reaction times are essential to attainment of high oxirane conversions at higher water concentrations. However, it is highly advantageous to process economics to be able to recycle recovered solvents having substantial water contents. Accordingly, the optimum water content for the reaction of any particular E¹ epoxide will need to be determined. This will not require undue experimentation and methods for doing it will be made readily apparent by the examples herein.

The amount of acid introduced to the reaction by the acid source material should be such as to provide about 0.3 or more acid hydroxyls (hydroxyl groups attached to phosphorus) per oxirane group present in the E¹ epoxide reactant. Preferably, the amount of acid is kept below about ⅓ mole of $H_3PO_4$ per equivalent weight of E¹ (i.e., below about 1 acidic hydroxyl per oxirane), thereby avoiding substantial decreases in water-resistance of the cured products. When E¹ is DER ®-667 (or an equivalent DGEBA-type epoxide), it is highly preferred that not more than 1 part by weight of $H_3PO_4$ be provided per 100 parts of E¹, i.e., that the P-OH/oxirane ratio is within the range of 0.5 to 0.6.

In the case of DGEBA-type resins within the DER ®-667 and -668 range, it has been found that better dispersion and cured film properties result when the final content of free $H_3PO_4$ in the reaction mixture is kept below 0.01 millimoles per gram of solids.

Greater amounts of acid, up to the point where the reaction mixture becomes undesirably non-homogeneous, may be employed. However, the use of more than enough $H_3PO_4$ to provide about 4 acidic hydroxyls per oxirane may result in the inclusion of enough free phosphate salt to have an undesirable effect on the properties of the uncured or cured product resin, thus necessitating removal of at least part of the excess acid (preferably before a base is introduced).

The epoxide/acid reaction can be carried out neat and a reaction medium (solvent) is not necessarily required. However, as discussed earlier herein, the use of a medium is essential to homogeneity of the reaction mixture when the amounts of water and/or $H_3PO_4$ present are high relative to the amount of the epoxide. Better results are obtained when the reaction mixture is homogeneous and it is generally preferable to employ a reaction medium in any case.

Suitable media for the reaction of the present process are inert materials which, in admixture with the reactants, form a solution or dispersion which is fluid at the reaction temperature to be employed. As employed in the present application, the term "inert" means that the medium does not detrimentally react with any material present to such an extent that at least one of the objects of the present invention cannot be realized.

Preferred media are inert organic compounds or mixtures which are liquid at ordinary temperatures, have boiling points below 150° C. and are solvents for the epoxides and phosphoric acid source material(s) to be used. The solvent should also be able to dissolve enough water to ensure that the desired ratio of dissolved water to acid (or oxirane groups) is attained. Exemplary of such media are dioxane, glycol ethers, lower alkyl acetates, methyl ethyl ketone, acetone, ethanol, isopropanol and methylene chloride in admixture with any of the preceding solvents. (The latter alcohols exemplify "inert" solvents which are not detrimentally reactive to an intolerable extent. They are particularly useful (as co-solvents) when precipitation tends to occur in their absence, as when aqueous $H_3PO_4$ is added to a dilute solution of an E¹ resin in a medium comprised solely of dichloromethane.)

The nature of the reaction medium effects both reaction rates and product composition. As a general rule, the rate of oxirane conversion by P—OH adduction and the proportion of diester groups in the reaction mixture is higher when a poor solvent for water is employed as the reaction medium.

At a temperature of about 60° C., the poor (or non-) solvents for water favor formation of higher polymer chains made up of E¹ epoxide residues linked together by diester groups

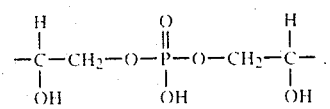

Thus, if DER ®-667 is reacted with 1% of its weight of $H_3PO_4$ (as 85% aq. $H_3PO_4$) in 100% $CH_2Cl_2$ at 60° C., the reaction mixture gels in about 4 hours. The chemical activity of water in a solvent such as dichloromethane, under these conditions, does not appear to be high enough to result in substantial hydrolysis of oxirane or ester groups. (However, the latter type of gel could be dissolved in a more water-miscible solvent and hydrolyzed to a fully useful product containing about equal numbers of glycol and monoester groups.)

If the reaction medium also contains as much as 25 wt. percent of a $CH_2Cl_2$-miscible solvent for water, such as acetone, diester formation is still the predominant reaction (at 60° C.) but the product is not a gel. At a temperature of 115°-120° C., the activity of the water (contained with the $H_3PO_4$) in a medium consisting of 75 wt. % $CH_2Cl_2$ and 25 wt. % acetone, is substantial. Diester formation does not proceed as far and hydrolysis of all of those diester groups which are formed occurs. As the proportion of acetone is further increased, however, diester content drops and the monoester content in the final product increases. The rates of reaction of water with both oxirane and diester groups (at 115°-120° C.) may rise as the $CH_2Cl_2$/acetone ratio drops. However, the ratio of glycol to monoester groups actually goes down suggesting that esterification is accelerated more than water/oxirane reaction by increasing the proportion of acetone.

The nature of the medium in which the neutralized reaction product is formed is also important. That is, the medium which serves best for the preparation of a given reaction product is not necessarily the medium from which the most stable or highest solids content dispersion of the neutralized product in water can be obtained.

Thus, tests have shown that although higher monoester contents are obtained from the (above discussed) reactions of DER ®-667 with 85% $H_3PO_4$ in acetone alone than in acetone/$CH_2Cl_2$ solutions, the presence of at least a minor amount of the dichloromethane is helpful to dispersibility of the neutralized product formed when water is added and the organic medium is removed. Accordingly, a $CH_2Cl_2$/acetone mixture in which the CH$_2$Cl$_2$/acetone weight ratio is within the range of 20/80 to 27/73 is a preferred reaction medium.

It has also been found that, in general, product particles formed upon stripping the neutralized epoxide/acid reaction mixtures exhibit less tendency to agglomerate when derived from solutions in dioxane or methyl ethyl ketone—particularly the latter solvent. Accordingly these solvents may be employed to particular advantage as media for the preparation of those neutralized acid-/epoxide products which are inherently more difficult to disperse in water. A counter consideration is that methyl ethyl ketone forms an azeotrope with water (whereas acetone and CH$_2$Cl$_2$/acetone mixtures do not), and may thereby require a considerably greater expenditure of energy in a large-scale process requiring a low water content in the recycled reaction medium.

If extractive removal of excess phosphoric acid at any stage prior to neutralization is contemplated, it is of course feasible to include an appropriate amount of a solvent which is not miscible with water, or prone to emulsify therewith, in the reaction medium. Also, solvents which are base sensitive, such as acetone, may first need to be removed if more than the stoichiometric requirement of a strong base will be employed to effect neutralization.

Mixtures of two or more solvents are in some instances preferred as providing a medium having a desired combination of solvent action and initial or azeotropic boiling point (reflux temperature).

Suitable reaction temperatures range from the lowest temperature at which P—OH adduction with oxirane groups (in the E$^1$ epoxide) proceeds at a useful rate to temperatures so elevated that (1) detrimental reactions (as between an alcohol reaction medium and the phosphoric acid) occur to an intolerable extent; or (2) excessively high solvent vapor pressures are developed. Temperatures within the range of from about 40° C. to about 150° C. will generally be found satisfactory but it is preferred to maintain the reaction temperature within the range of from about 70° C. to about 135° C. The range of from about 100° to about 125° is particularly preferred and a range of about 110°–120° appears to approximate the optimum for commercial practice of the present process invention.

Some indication of the interdependence of temperature and solvent effects has been given in the preceding discussion herein of reaction media.

The time required to attain an equilibrium (between esterification and ester hydrolysis reactions) of course is considerably reduced by resort to higher temperatures; also, free acid contents tend to be lower and diester contents higher. At lower temperatures, the longer contact times required are such that diester groups are hydrolyzed to a greater extent and monoester (and glycol group) contents are accordingly higher.

Contact time is otherwise important primarily in that the reaction is generally allowed to proceed until less than 1%, and preferably less than 0.5% of the oxirane groups originally present are consumed. It is only necessary to convert as much of the epoxide as is required to produce a reaction product having essentially the character of the more highly reacted epoxide/acid products of the invention. That is, epoxide conversion need be only essentially complete.

In most instances, contact times of from about 1 hour (at temperatures in the vicinity of 150° C.) to about 24 hours (at about 60°–70° C.) will be satisfactory. Ordinarily, essentially complete conversion of the E$^1$ epoxide to a product which will be water-thinnable, when neutralized, can be attained in about 3–6 hours contact time at a temperature of about 125°–100° C.

It of course is not necessary to let the reaction proceed until equilibrium is attained. In the case of DER ®-667, for example, the composition of the reaction product after only 3 hours contact time (at 115° C.) is such that it is readily dispersible (as an amine salt) in water and yields excellent cured films.

Pressure is an important parameter of the reaction only in that operation under elevated pressures—at least equal to the autogenous pressure of the reaction mixture—are required when reaction temperatures above the normal atmospheric boiling point of the reaction medium are employed. The reaction can of course be carried out at sub-atmospheric pressures if desired.

Procedure

The reaction of the E$^1$ epoxide with the orthophosphoric acid source material (and such water as may be present) is readily carried out in conventional equipment.

The first step will normally consist of dissolving the E$^1$ epoxide in the reaction medium (or in the component thereof which is the best solvent for the epoxide). In the case of the higher molecular weight epoxides, at least, dissolution in most solvents is somewhat slow at ordinary temperatures and will usually require agitation of the resin/solvent mixture for a period of time such as about 8 hours or more. This of course can be done at any time prior to carrying out the reaction, in any appropriate facility.

The acid source material, usually 85% aq. H$_3$PO$_4$, may be pre-dissolved in or diluted with one or more components of the reaction medium, to facilitate mixing with the epoxide solution. In any case, it will usually be more convenient to run the acid material into the epoxide solution, rather than vice versa. However, gradual introduction of the reactants to each other is generally not necessary and either may be added to the other as rapidly as desired without the occurrence of uncontrollable heat evolution (except in the case of such a reactive epoxide as the diglycidyl ether of bis-phenol-A).

The mixed reactants are heated, preferably with agitation, to the desired reaction temperature in a vessel suitably equipped with a reflux condenser and a pressure seal or such other apparatus as is appropriate. The vessel contents are kept at temperature at least until sufficient oxirane conversion has been attained to result in a water-thinnable product (upon base addition). Relatively intense agitation is essential if the reaction medium is a poor solvent for water and/or the H$_3$PO$_4$-source material.

The reaction mixture is cooled and then "neutralized" as discussed below, diluted with water and stripped of lower boiling materials. If a reaction medium consisting of or comprising a solvent higher boiling than water has been used for the reaction, addition of water may be delayed until the high boiling solvent(s) have been replaced with a lower boiling solvent (which is then stripped off after the water is added).

It is generally desirable to add the water gradually, with good agitation, as otherwise coagulation of the salified (neutralized) resin may result. Preferably, the mixture is agitated at a rate just below that at which vortexing tends to occur.

If the esterification product has a high glycol to ester group ratio (up to about 12 for DER ®-667-derived products, and probably even higher for products derived from lower EEW resins), it may be necessary to use MEK or $CH_2Cl_2$/acetone as the dispersion medium, in order to get a stable dispersion (in water).

Base Neutralization

The reaction product of $E^1$ and $H_3PO_4$ may be neutralized with any base of such nature that the neutralized product will be water-thinnable. Depending on factors which will be apparent to those skilled in the art, complete neutralization is not necessarily required in all cases. That is, the acid/epoxide reaction product need be reacted with only as much base as is necessary to provide the proportion of salified ester P—OH groups required to achieve water-thinnability. However, provision of at least one equivalent of base per phosphate ester group is generally preferable and will usually be essential when the acid number of the product resin is relatively low. At the other extreme, an excess of base over that required to completely neutralize all acidic hydrogens present in the acid/epoxide reaction product (including any free $H_3PO_4$) may be used.

It has been found (see Example 20) that the proportion of base employed in the neutralization can substantially effect the size of the resin particles in the aqueous dispersion, which in turn is an important criterion of dispersion quality. In the case of DGEBA resins having EEW's in the DER ®-667 range, for example, substantially smaller weight average particle sizes result when 3 moles of triethylamine, rather than 2, are employed per mole of $H_3PO_4$ charged to the reaction. In fact, a ratio of 3.5 moles per mole is contemplated for the production of -667-derived coating resins by the method of the present invention.

Exemplary types of bases suitable for the practice of the present invention are:
A. Alkali metal hydroxides, such as lithium, sodium and potassium hydroxides, etc. These bases may be employed with resins which are to be used (as surface active materials, for example) in the form of the uncured salts or in which the reactive functions present (secondary alcoholic hydroxyls) may be utilized to effect curing.
B. Oxides or hydroxides of alkaline earth metals, such as beryllium or calcium, which form phosphates or acid phosphates having measurable water solubilities. Again, curing of such salts will require the presence of the above-named reaction functions. The salts may also be utilized as water-dispersible sealers or primers on materials such as unfired ceramics which are subsequently to be fired.
C. Oxides or hydroxides of other metals, such as copper and iron, which form phosphates or acid phosphates having measurable water solubilities, as such or as hydrates, complexes with ammonia, etc.
D. Ammonia or ammonium hydroxide.
E. Organic bases. This class of bases is highly preferred and includes the following types of compounds:
 a. choline and guanidine;
 b. aliphatic mono- and polyfunctional amines, such as methyl amine, n-butyl amine, diethyl amine, trimethyl amine, diethylenetriamine, n-hexylamine, ethylene diamine, allyl amine, etc.;
 c. cycloaliphatic amines, such as cyclohexyl amine, cycloheptyl amine, etc.;
 d. aromatic amines, such as aniline, N,N-dimethyl aniline, diaminobenzenes, etc.;
 e. heterocyclic amines, such as ethylenimine, piperazine, morpholine, pyrrolidine, pyridine, hexamethylenimine, etc.; and
 f. alkanolamines and alkylalkanol amines, such as ethanolamine, dimethylaminoethanol, diethylaminoethanol, diisopropanolamine, triisopropanolamine, 4-hydroxy-n-butylamine, 2-dimethylamino, 2-methyl, 1-propanol, etc.

Among each of the preceding classes a-f, those compounds which can be removed from the neutralized resin dispersions, during or after water boil-off, by heating to temperatures less than those required to attain satisfactory cure rates, are preferred. Particularly preferred are those organic bases of classes b and f which can be removed by heating to temperatures below about 150° C. This will generally be feasible with such bases having boiling points of less than 150° C. at a pressure of 760 mm Hg.

Among the latter bases, the most preferred are amines of the formula $NR_3$, wherein each R is H, methyl or ethyl independently, except that not more than one R is H. In order of decreasing preference, according to such factors as curing time (including the time required to effect de-neutralization and amine removal) and the viscosity and ease of stripping of the neutralized reaction mixture, highly preferred specific such amines are triethylamine, dimethylamine, trimethylamine and diethylamine. Triethylamine is particularly preferred, not only with regard to the preceding factors but also because such amounts of it as remain in the cured coatings have been found not to be readily leached out by water, even at such elevated temperatures as are encountered in processing of canned foods.

Next most preferred are alkanolamines of the formula $R_2'N—CH_2—CH_2—OH$, wherein one R' is H, methyl or ethyl and the other, independently, is H, ethyl or 2-hydroxyethyl. In order of decreasing preference, those specific alkanol amines which are more highly preferred are N,N-dimethylethanolamine, N-methylethanolamine, ethanolamine and diethanolamine.

Triethanolamine is apparently not suitable for the neutralization of higher molecular weight acid/epoxide reaction products of the invention. DER ®-667/$H_3PO_4$ reaction mixtures neutralized with triethanolamine, diluted with water and stripped (to a solids content of about 50%) have not yielded dispersions. However, triethanolamine does not cause any problems when included with Cymel ®303 (hexamethoxy methyl melamine) in coating formulations of the dispersions of the present invention.

It has also been observed that higher molecular weight products of this type neutralized with dimethylaminomethylpropanol,

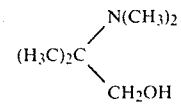

disperse well only if the amount of $H_3PO_4$ employed in the acid/epoxide reaction is greater than about 1 part per hundred parts of the resin (DER ®-667).

Mixtures of any of the foregoing amines and alkanolamines may of course be employed for particular applications where they are of advantage.

Neutralization is usually carried out by diluting the acid/epoxide reaction mixture (including the solvent used) with enough water to give a dispersion which is satisfactorily easy to stir, and then adding the base (or vice versa). When no acid has been removed from the epoxide/acid reaction mixture, a very convenient method is simply to add a set number of equivalents of base (2 moles of an amine, for example) for each mole of $H_3PO_4$ (100%) charged to the reaction. However, the amount of base required may be measured out according to a predetermined acid content in the material to be neutralized. Alternatively, litmus or pH paper or a pH meter may be used to determine when to stop adding base. Another option which may be satisfactory in routine operation is simply to add the base, in increments and with good stirring, until the appearance or behavior of the stirring dispersion markedly alters in a way known to correspond to attainment of the desired degree of neutralization. In general, however, a definite pH, within the range of from about 6 to about 10, (preferably about 6.5 to about 9) will be preselected as the end-point for the neutralization. Since the rate of the neutralization will drop off as the number of unneutralized, acidic hydroxyls present decreases, sufficient time should be allowed after each base addition to ensure that any apparent end-point is in fact a true end-point. Ordinarily, no pH drift should be observable after about an hour. A particularly exact method of neutralization is described in Example 12 herein.

Water-thinning and Utilization of the Neutralized $H_3PO_4$/epoxide Reaction Product Unless the neutralized product is to be used without being shipped, as little water as possible will ordinarily be used in preparing it, so that shipping costs will be held down. However, prior to application to a substrate to be coated, the neutralized (and stripped) material will usually be thinned with additional water to a consistency dependent on the amount of additives or curing agents which must be co-dissolved, the mode of application contemplated, the viscosity desired, the thickness of the coating to be formed, and so on. (It is generally preferred to prepare the aqueous product dispersions at a level of 50% solids and no difficulty has been experienced in further thinning such dispersions with water.) Energy requirements for water evaporation are of course another consideration. Ordinarily, the water employed as a thinner will be added at a relatively low rate, with good stirring, so as to avoid any tendency to form a quasi-stable mixture of two discrete liquid phases. However, in some cases, reverse or even "all at once" addition may be permissible.

Stripping of the neutralized mixture is carried out in a generally conventional manner at a pressure appropriate to the normal boiling point of the solvent(s) to be removed. Care should be taken to avoid excessive kettle temperatures during stripping so that undesired hydrolysis of ester groups does occur. Undesirably high kettle temperatures are most likely to occur during the latter stages of stripping, particularly when a relatively high boiling, water miscible solvent has been used in or as the reaction medium. In the latter situation, a relatively low stripping rate or some other expedient, such as addition of a solvent which forms a lower boiling azeotrope with the water-miscible solvent, should be resorted to.

In an alternative mode of utilization, the neutralized reaction product may be converted, as by spray-drying, for example, to a powder which can subsequently be dissolved in water or applied directly to substrates by known powder-coating techniques.

Aqueous solutions of the neutralized reaction products can be applied to various substrates to be coated, by such known techniques as spray coating, dipping, roller coating, brushing or by use of draw bars. Removal of the water from the resultant aqueous films is readily accomplished by known methods, such as passing an air stream of controlled temperature and moisture content over the film at a controlled rate, passing the film through a zone of reduced pressure, heating, etc. When the salt moieties present in the neutralized reaction product (resin) are of such a nature as to be readily decomposed by heating and the base evolved upon decomposition in volatile, all or at least a substantial portion of the base may be removed during the water-removal operation.

Any base remaining after water removal may be essentially removed by further heating, under ordinary or reduced pressure. The removed base ordinarily will be recovered, as by condensation or by acid scrubbing.

As indicated earlier herein, curing of the resin after water and base removal may be accomplished by means of any suitable agency. If an auxiliary chemical curing agent is to be employed, the agent may be introduced prior to water removal or subsequently (as by being sprayed as a solution in a volatile solvent on the uncured film). In general, the most convenient and economical method of curing will be simply by application of heat, as by baking, to effect cross-linking reactions between the reactive functional groups in the deneutralized coating, such as secondary hydroxyls, P—OH groups and any groups reactive therewith, in added curing agents, such as ureas, melamines and phenolics.

Methods of Characterizing Products

1. Titration of acids

The relative amounts of the phosphoric acid charged to the reaction which report in the product mixture as the free acid, as monoester groups and as diester groups may be determined by either of the following methods.

Direct Titration

A sufficient sample of the reaction mixture to provide about 1 millequivalent (meq) of P-OH (based on total acid present) is dissolved in 35 ml. of a solvent consisting of 66.7 wt. % 2-butanone, 16.65% methanol and 16.65% water. The solution is titrated with about 0.3 N methanolic tetrabutylammonium hydroxide, using a Metrohm/Herisan automatic titrimeter, to a second break (inflection) in the resulting conductivity vs. titrant-volume curve. 10 ml. of water and 10 ml. of 10% aq. $CaCl_2$ are added and allowed to react for about 10 minutes, thereby converting all phosphomono- and diester groups to neutral calcium salt groups. The free phosphoric acid is converted to the monoacidic phosphate, $CaHPO_4$. All of the calcium-containing products precipitate but a third break on the titration curve can now be observed, without interference from the second monoester proton, upon neutralization of the proton in the $CaHPO_4$ with more of the quaternary hydroxide base. The amount of base required to produce the first break is that consumed by the sole acidic proton in the diester and by the first protons in the monoester groups and the free acid. The additional amount of base required to reach the second break is that consumed by the second (last) proton in the monoester groups and by the second proton in the free acid. The additional amount of base to reach the last break is consumed solely by the last proton in the calcium salt derived from the free acid. If the total volumes of base solution required to reach the successive breaks are denoted as $v_1$, $v_2$ and $v_3$, the relative amounts of phosphate present in the sample as mono- and diester groups and as the free acid may be calculated from the following relationships:

Free $H_3PO_4$ content $\propto$ $(v_3-v_2)$
Monoester content $\propto$ $(2v_2-v_1-v_3)$
Diester content $\propto$ $(2v_1-v_2)$.

The preceding method is considered satisfactory for esterification products containing a total of about 2.5 phr or more of $H_3PO_4$ (as such and as esters). For lower acid contents, the following method is considered to be more accurate.

Extraction Method

In this method, the sample is dissolved in toluene/n-butanol and extracted with water to remove the free acid. The aqueous extract is titrated for free acid content and the organic raffinate is titrated for mono- and diester contents. The triester content of the sample is calculated as the difference between the $H_3PO_4$ charged to the reaction and that present in the sample as free acid, mono- and diester. In some instances, complete extraction of the free acid or good phase disengagement may be difficult to attain and the triester contents calculated (by difference) will be correspondingly erroneous on the high side. However, the accuracy of the analysis for mono- and diester contents is not effected, because the free acid error cancels out. Also, high contents of triester (which hydrolyzes even more readily than diester) in equilibrated reaction products not formed under anhydrous conditions will clearly be suspect. The details of the "extraction method" follow.

Duplicate samples of the reaction mixture, size to contain about 6 grams of solids each, are taken. Each sample is rapidly (15 seconds or less) weighed out, placed in a 250 ml disposable beaker, and stirred with 100 ml of toluene/1-butanol ($\sim$3/1 by volume) until solution is complete (usually $\sim$5 minutes or less), using a stirring speed just below that at which vortex formation occurs. The solution is transferred (together with a 20 ml toluene/butanol rinse of the beaker) to a 250 ml separatory funnel, and shaken with 75 ml of distilled water for 1 minute. The aqueous phase is allowed to separate and drained off into a 400 ml beaker. The organic phase is mixed with 10 ml of 1-butanol, thereby causing the separation of more aqueous phase which is drawn off and combined with the aqueous extract in the beaker. The water extraction and butanol addition steps are repeated twice more (total 3×75 ml of water and 3×10 ml butanol).

The combined aqueous phases are titrated, with stirring, to a second break-point, using 0.1 N NaOH and Metrohm automatic titrator. The organic phase is mixed with 10 ml pyridine and titrated in the same manner but using a 0.2 N solution of tetrabutyl ammonium hydroxide (TBAH) in methanol/isopropanol.

The m moles of free $H_3PO_4$ (per gram of solids) in the aqueous phase is calculated as $$\frac{(v_2 - v_1)(\text{NaOH normality})}{\text{sample wt.} \times \% \text{ solids}},$$

$v_1$ and $v_2$ being the total amounts of titrant added to reach the first and second break points, respectively.

For the organic phase, the ester contents are calculated as:

$$\text{m mol/g resin monoester} = \frac{(v_2 - v_1) \times (\textit{TBAH} \text{ normality})}{\text{sample wt.} \times \% \text{ solids}}$$

$$\text{m mol/g resin diester} = \frac{(2v_1 - v_2)(\textit{TBAH} \text{ normality})}{\text{sample wt.} \times \% \text{ solids}}.$$

The values found for the replicate samples are averaged.

The proportion of the consumed epoxide groups converted to glycol groups (by hydrolysis reactions) is calculable for any stage of the reaction from the following relationship (assuming the only conversion products are glycol, monoester or diester groups):

$$\% \, e_g = 100 - \frac{M_A}{e_o - e_p} (\%m + 2(\%d)) \tag{1}$$

wherein
$e_p$ = equiv. epoxide present in product as such
$e_o$ = equiv. of epoxide charged to reaction
$e_g$ = equiv. epoxide converted to glycol groups
$M_A$ = moles $H_3PO_4$ charged to reaction
%m = mole % charged acid reporting as monoester
%d = mole % charged acid reporting as diester.

The number ratio of glycol to monoester groups in the product is equal to $e_g/(M_A \times \%m/100)$. If the only oxirane conversion products present are glycol or monoester groups, the latter number ratio is simply % $e_g/(100 - \%e_g)$, regardless of the degree of oxirane conversion which has been attained.

2. Titration of oxirane groups

The standard method of analysis, using a 25% solution of tetramethyl ammonium bromide in glacial HOAc and back-titrating against crystal violet with 0.1 N solution of perchloric acid in glacial AcOH, was found to be suitable and was employed in all determinations of oxirane contents given in the following examples.

3. Viscosity measurements

As an indicator of crosslinking and/or molecular weight changes, the viscosities of some of the reaction mixtures described in the Examples herein were measured by the well-known Gardner method.

EXAMPLES

The following examples are for purposes of illustration and are not to be construed as limiting the scope of the invention, which is to be determined only by the claims appended with this specification.

EXAMPLE 1

"Solubilization" of DER ®-667 by reacting with 65% or 75% $H_3PO_4$ and neutralizing with triethylamine.
EEW = ~2000; 3 P—OH hydroxyls per oxirane.

A. The resin is dissolved in an equal weight of dioxane and the solution mixed at room temperature with 75% $H_3PO_4$ in an acid/resin weight ratio (13.26/200 g) such as to provide about 5 phr of $H_3PO_4$; or 3.0 P—OH groups per equivalent of oxirane. A sample of the resulting mixture (number 0) is immediately "quenched" (stored at low temperature) as an analytical control sample. Other portions of the mixture are put in each of seven sequentially numbered vials which are then placed in a 70° oven. The vials are removed from the oven in number sequence at the elapsed times given in the following table and rapidly cooled to "quench" the reaction on-going therein.

Samples of the contents are then titrated for oxirane (EEW), free $H_3PO_4$, phosphomonoester and phosphodiester. The Gardner viscosity of each reaction mixture is determined and its dispersibility in water, after neutralization with triethylamine, is checked.

B. Experiment A is repeated, but using 65% $H_3PO_4$ in an amount (15.3 grams) such as to provide 3 acidic hydroxyls (3 P-OH groups) per equivalent of the resin ($H_2O/H_3PO_4$ mol ratio=2.87, versus 1.81 in Experiment A.

The results of Experiments A and B are summarized in Table 1 following.

adduction of one oxirane group per molecule of $H_3PO_4$). No unreacted epoxide could be detected.

The reaction mixture was extracted with 50 ml. of water and the acid content of the extract was found (by titration with dilute KOH) to be 0.013 equivalents. The "raffinate" required 3 grams (0.03 equivalents) of triethylamine for neutralization. The total acid consumption for the reaction was then 0.076-(0.013+0.030)=0.033 equivalent, or 0.033/0.025=1.32 P-OH per oxirane.

B. Experiment A was repeated, except that 25 ml. of a dioxane solution containing 2.94 grams (0.076 equivalent) of 85% $H_3PO_4$ were used in place of the acid

TABLE 1

|  | A*-1 | A-2 | A-3 | A-4 | A-5 | A-6 | A-7 | B**-1 | B-2 | B-3 | B-4 | B-5 | B-7 |
|---|---|---|---|---|---|---|---|---|---|---|---|---|---|
| Reaction Time @ 70° C., Hrs. | ½ | 1 | 1½ | 3 | 4 | 5 | 6 | ½ | 1 | 1½ | 3 | 4 | 6 |
| % oxirane consumed | 27.4 | 45.6 | 75.3 | 86.5 | 94.0 | 95.8 | 98.1 | 62.8 | 75.8 | 87.9 | 93.9 | 94.1 | 95.4 |
| Viscosity, Gardner, sec. | 77 | 144 | 259 | 331 | 293 | 173 | 160 | 79 | 133 | 164 | 135 | 118 | 106 |
| $H_2O$ disp.*** | No | Yes | Yes | Yes | Yes | Yes | Tes | No | No | Yes | Yes | Yes | Yes |
| Free acid %[1] | — | 51.7 | 47.9 | 42.8 | 47.5 | 55.2 | 51.0 | 54.0 | 54.9 | 49.7 | 53.2 | 53.1 | 53.0 |
| Monoester %[1] | — | 41.2 | 45.6 | 50.1 | 47.9 | 41.0 | 46.8 | 41.7 | 40.5 | 45.5 | 42.9 | 44.9 | 44.6 |
| Diester %[1] | — | 0.71 | 6.7 | 7.1 | 4.6 | 3.9 | 2.2 | 4.3 | 4.6 | 4.9 | 4.0 | 2.0 | 2.4 |
| % oxirane consumed which reports as glycol groups | — | 8.2 | 21.5 | 25.6 | 39.1 | 49.1 | 47.9 | 19.9 | 34.4 | 37.0 | 45.8 | 48.0 | 48.2 |
| glycol/monoester ratio |  |  |  |  |  |  | ~1:1 |  |  |  |  |  | ~1:1 |

NOTES:
[1] % charged acid reporting in product as such or as mono- or diester, as indicated.
*75% $H_3PO_4$
**65% $H_3PO_4$
***dispersible

EXAMPLE 2

Borderline solubilization of ER ®-667 by reaction with 99% aq. $H_3PO_4$ in dioxane at 70° C. and neutralization with triethylamine. EEW ~2000; 3 P-OH (3 P-OH hydroxyls or 3 acidic hydroxyls) per oxirane.

The experiment of Example 1-A was essentially repeated, but using 99% $H_3PO_4$ rather than the 75% acid.

The reaction was terminated after 6 hours contact. The neutralized product exhibited borderline dispersibility.

EXAMPLE 3

Solubilization of ER ®-664 by reacting with 99% or 85% $H_3PO_4$, in dioxane at reflux, and neutralizing with triethylamine. EEW ~1000; P-OH/oxirane=3; phr $H_3PO_4$=10.

A. 25 grams (0.025 equiv.) of DER ®-664 was dissolved in 25 grams of dioxane. To the resulting solution was added 25 grams (~0.076 equiv.) of a 10% solution of 100% $H_3PO_4$ (99%, allowing for some moisture uptake in handling) in dioxane. The mixture (solution) was heated to reflux (~101°), refluxed 3 hours and cooled to room temperature. The acid number of the reaction mixture was found to be 124.05 (vs 102, theoretical for solution employed in A. The acid number of the reaction mixture was lower (108), the acid contents of the extract and raffinate respectively were 0.009 and 0.035 and the acid consumed in the reaction, again, was 0.033 equivalent.

Both of raffinates A and B (after being stripped of residual dioxane), gave faintly hazy but stable dispersions in water at a solids level of 41%.

EXAMPLE 4

Effect of EEW and P-OH/oxirane ratio on solubilization of DGEBA-type epoxy resins by reaction with 85% $H_3PO_4$.

Four DGEBA-type resins varying in EEW from 190 to 2000 were separately reacted at 75° in dioxane with amounts of 85% $H_3PO_4$ such as to provide from 0.5 to 3.0 P-OH groups per oxirane. The dispersibility of each reaction mixture, as such and when neutralized with triethylamine and stripped of solvent, was checked. The results are summarized in Table 2 following. From the data in the latter table, it would appear that a P-OH to oxirane ratio of 0.5 is too low for the purposes of the present invention. However, the results presented in Examples 11, 16, 17-B, 18 and 20 herein show that this is not so, at least for esterification products formed in and/or dispersed from actone or acetone/$CH_2Cl_2$.

TABLE 2

| Resin | | DER ®-331 | | | | DER ®-661 | | | | DER ®-664 | | | | DER ®-667 | | | |
|---|---|---|---|---|---|---|---|---|---|---|---|---|---|---|---|---|---|
| EEW | | 190 | | | | 500 | | | | 1000 | | | | 2000 | | | |
| Eq. Acid/Epoxide* | | .5 | 1.0 | 1.5 | 3.0 | .5 | 1.0 | 1.5 | 3.0 | .5 | 1.0 | 1.5 | 3.0 | .5 | 1.0 | 1.5 | 3.0 |
| % Acid (85%) | | 9.3 | 17.0 | 23.5 | 38.1 | 4.15 | 7.97 | 11.5 | 20.9 | 1.91 | 3.75 | 5.5 | 10.4 | .96 | 1.9 | 2.84 | 5.5 |
| Time @ 75° C. | | 1 hour | | | | 3 hours | | | | 3 hours | | | | 7 hours | | | |
| Dispersibility | (V Very viscous) (G Gelled) | | | | | | | | | | | | | | | | |

TABLE 2-continued

| Resin | DER ®-331 | DER ®-661 | DER ®-664 | DER ®-667 |
|---|---|---|---|---|
| in H₂O (+ Dispersible) (− Not dispersible) (? Borderline) | | | | |
| (a) Resin + Dioxane | G + + + | G − − − | V − − − | V − − − |
| (b) Resin + Dioxane + Amine | G + + + | G + + + | V + + + | V − ? + |
| (c) Resin + Amine + water, less dioxane | G + + + | G + + + | V + + + | V ? ? + |

*P-OH/oxirane ratio.

EXAMPLE 5

Effects of several reaction parameters on water dispersibility and properties of films made from amine-neutralized reaction products of $H_3PO_4$ and DGEBA-type resins having EEW's of from 183 to 689.

DER ®-331, -661 and -662 resins were reacted at 70° in dioxane with amounts of 85% $H_3PO_4$ which provided 1.5 or 3.0 P-OH hydroxyls per oxirane, essentially in the manner of Example 1-A. Aqueous dispersions of the products were made by mixing them with additional dioxane in an 8/5 weight ratio, neutralizing with triethyl amine, dispersing in water and stripping off the solvent and excess amine in a rotary evaporator under reduced pressure. Films were drawn from dispersions of the final products on Parker 4"×12" aluminum test panels with a #6 wire wound rod (about 0.1 mil film thickness). Otherwise identical films were drawn on aluminum can end stock from the same dispersions but containing 10 to 30 weight percent (based on product solids) of CYMEL ®-303 melamine resin. All films were cured 5 minutes at 190° C. (unless otherwise noted) and evaluated for acetone resistance, flexibility, adhesion and boiling water resistance.

The results are summarized in Tables 3–6 following. It will be seen (Table 4) that the number ratio of glycol to monoester groups was substantially lowered, in each case, when the P-OH to oxirane ratio was doubled, but was not effected very much by the differences in EEW between the starting resins. It will also be seen from the Table that all of the product resins were dispersible (when neutralized) in water, after reaction times of 2 hours.

TABLE 3

SAMPLE PROPERTIES

| Resin EEW P-OH/oxirane | Sampled after reaction time of | EEW (g) | % Epoxide | % Epoxide Used | Viscosity (Gardner Sec.) | Dispersion Comments |
|---|---|---|---|---|---|---|
| DER ®-331 | 5 min. | 2330 | 2.02 | 92.13 | — | Very clear-almost a solution |
| 183 | 0.5 hr. | 16500 | 0.28 | 98.91 | 69 | " |
| 1.5/1 | 1 | 49400 | 0.10 | 99.61 | 55 | " |
| DER ®-331 | 5 min. | — | — | — | — | " |
| 183 | 0.5 hr. | 16600 | 0.28 | 98.91 | 72 | " |
| 3.0/1 | 1 | 26000 | 0.18 | 99.30 | 67 | " |
| | 2 | 66500 | 0.07 | 99.73 | 62 | " |
| DER ®-661 | 5 min. | 750 | 6.28 | 26.24 | 124 | Gelled-no dispersion possible |
| 552 | 0.5 hr. | 2160 | 2.18 | 74.40 | ∞ | " |
| 1.5/1 | 1 | 35600 | 0.13 | 98.47 | very large | White opalescent dispersion |
| DER ®-661 | 5 min. | 5190 | 0.91 | 89.31 | 1480 | Somewhat Dispersible |
| 552 | 0.5 hr. | 32200 | 0.15 | 98.24 | 760 | Dispersible |
| 3.0/1 | 1 | 168000 | 0.03 | 99.65 | 543 | " |
| DER ®-662 | 5 min. | 780 | 6.03 | 11.60 | 87 | Non-Dispersible Gel |
| 689 | 0.5 hr. | 1750 | 2.68 | 60.71 | Very Large | " |
| 1.5/1 | 1 | 8640 | .54 | 92.08 | ∞ | " |
| | 2 | 60350 | .08 | 98.83 | 488 | Dispersible |
| DER ®-662 | 5 min. | 42400 | .11 | 98.39 | 360 | " |
| 689 | 0.5 hr. | 50250 | .10 | 98.53 | 330 | " |
| 3.0/1 | | | | | | |

Note: Exotherm occurred upon mixing reactants, in each instance.

TABLE 4

| Resin P-OH/Oxirane EEW | Sample Time | Product Compositions % H₃PO₄ in Product as | | | Distribution in Products of Oxirane Charged to the Reaction | | | Number Ratio Glycol to Monoester Groups |
|---|---|---|---|---|---|---|---|---|
| | | Free Acid | Mono Ester | Di Ester | Milliequiv. Hydrolyzed Oxirane | Milliequiv. as Monoester | Milliequiv. as Diester | |
| 331 | 0.5 hr. | 32.8 | 51.7 | 15.6 | 57.5 | 25.9 | 15.6 | 2.22 |
| 1.5/1 | 1 | 33.5 | 54.8 | 11.8 | 60.4 | 27.4 | 11.8 | 2.20 |
| 183 | 6 | 33.6 | 63.0 | 3.4 | 65.1 | 31.5 | 3.4 | 2.07 |
| 331 | 5 min. | 45.1 | 47.1 | 7.9 | — | — | — | — |
| 3.0/1 | 0.5 hr. | 48.7 | 45.3 | 6.1 | 41.4 | 51.4 | 6.1 | 0.81 |
| 183 | 1 | 46.7 | 47.0 | 6.3 | 39.7 | 53.3 | 6.3 | 0.74 |
| | 6 | 49.7 | 49.7 | 0.7 | 48.9 | 50.4 | 0.7 | 0.97 |
| 661 | 5 min. | 41.3 | 44.3 | 14.5 | 0 | — | — | — |

TABLE 4-continued

| Resin P-OH/Oxirane EEW | Sample Time | Product Compositions % H3PO4 in Product as | | | Distribution in Products of Oxirane Charged to the Reaction | | | Number Ratio Glycol to Monoester Groups |
|---|---|---|---|---|---|---|---|---|
| | | Free Acid | Mono Ester | Di Ester | Milliequiv, Hydrolyzed Oxirane | Milliequiv. as Monoester | Milliequiv. as Diester | |
| 1.5/1 | 0.5 hr. | — | — | — | — | — | — | — |
| 552 | 1 | 30.9 | 45.7 | 23.4 | 52.2 | 22.9 | 23.4 | 2.28 |
| | 6 | 26.8 | 66.2 | 7.0 | 59.9 | 33.1 | 7.0 | 1.81 |
| 661 | 5 min. | 40.6 | 49.4 | 10.1 | 19.7 | 59.5 | 10.1 | 0.33 |
| 3.0/1 | 0.5 hr. | 23.5 | 67.0 | 9.6 | 12.0 | 76.6 | 9.6 | 0.16 |
| 552 | 1 | 39.2 | 52.3 | 8.5 | 30.4 | 60.8 | 8.5 | 0.50 |
| | 6 | 39.6 | 58.2 | 2.3 | 31.2 | 58.1 | 2.3 | 0.64 |
| 662 | 5 min. | 37.0 | 42.3 | 20.7 | 0 | — | — | — |
| 1.5/1 | 2 hr. | 25.4 | 52.0 | 22.6 | 50.2 | 26.0 | 22.6 | 1.93 |
| 689 | 6 | 26.9 | 61.1 | 12.0 | 57.5 | 30.6 | 12.0 | 1.88 |
| 662 | 5 min. | 46.1 | 45.6 | 8.3 | 36.2 | 53.9 | 8.3 | 0.67 |
| 3.0/1 | 0.5 hr. | 42.5 | 49.6 | 7.9 | 33.1 | 57.5 | 7.9 | 0.58 |
| 689 | 6 | 44.1 | 52.7 | 3.2 | 40.9 | 52.4 | 3.2 | 0.78 |

TABLE 5

PHYSICAL PROPERTIES OF CURED FILMS*
NOT INCLUDING MELAMINE RESIN

| Sarting Resin | DER®-331 | DER®331 | DER®-331 | DER®-331 | DER®-661 | DER®-661 | DER®-661 | DER®-662 | DER®-662 |
|---|---|---|---|---|---|---|---|---|---|
| Ratio: P-OH/oxirane | 1.5 | 1.5 | 3.0 | 3.0 | 1.5 | 1.5 | 3.0 | 1.5 | 3.0 |
| % Solids** | 48.3 | 24.1 | 46.7 | 23.3 | 17.6 | 17.6 | 20.8 | 14.5 | 16.3 |
| Bake | 5'/190° | 5'/190° | 5'/190° | 5'/190° | 2'/190° | 5'/190° | 5'/190° | 5'/190° | 5'/190° |
| Surface Wetting | Poor | Good | Poor | Good | Good | Good | Good | Good | Good |
| Acetone Resis. | Excellent | Excellent | Excellent | Excellent | Failed | Excellent | Excellent | Sl. Soft | Excellent |
| Reverse Impact Inch Lbs. | Failed at 20 | Failed at 20 | Failed at 20 | Failed at 20 | Failed at 20 | Passed 20 | Passed 20 | Passed 20 | Passed 20 |
| Boiling H2O, 15' | No Blush | Severe | Slight | Slight | Severe | No Blush | None | None | None |
| Tape Adhesion | Excellent | Good | Good | Good | Excellent | Fair | Excellent | Excellent | Excellent |

*Prepared from 6-hour reaction product in each series (see Tables 3 and 4).
**In dispersion.

TABLE 6

PHYSICAL PROPERTIES OF CURED FILMS*
CONTAINING MELAMINE RESIN

| Starting Resin | DER®-331 | DER®-331 | DER®-331 | DER®-331 | DER®-661 | DER®-661 |
|---|---|---|---|---|---|---|
| P—OH/oxirane | 1.5 | 1.5 | 3.0 | 3.0 | 1.5 | 1.5 |
| % Cymel®-303** | 30 | 10 | 30 | 10 | 26.1 | 10 |
| % solids** | 57.1 | 50.9 | 55 | 50 | 22.4 | 19.2 |
| Surface Wetting | Good | Good | Fair | Fair | Poor | Fair |
| Appearance | Clear | Clear | Slightly Hazy | Slightly Hazy | Clear | Clear |
| Acetone; 20 rubs. | Pass | Pass | Pass | Pass | Pass | Pass |
| Wedge Bend, Inches | Failed at 3 | Failed at 3 | Failed at 3 | Failed at 3 | Failed at 3 | Failed at 3 |
| Boiling H2O - 15' Blush | None | None | Very Slight | Very Slight | Slight | None |
| Tape Adhesion*** | Pass | Pass | Pass | Pass | Pass | Pass |
| Pinholes-Film Failure-Acid Cu Sulfate -2' | Slight | Moderate | Severe | Moderate | Severe | None |

| Starting Resin | DER®-661 | DER®-661 | DER®-662 | DER®-662 | DER®-662 | DER®-662 |
|---|---|---|---|---|---|---|
| P—OH/oxirane | 3.0 | 3.0 | 1.5 | 1.5 | 3.0 | 3.0 |
| % Cymel®-303** | 30 | 10 | 30 | 10 | 30 | 10 |
| % solids** | 27.3 | 22.6 | 19.6 | 15.8 | 21.7 | 17.7 |
| Surface Wetting | Fair | Good | Fair | Fair | Fair | Fair |
| Appearance | Clear | Clear | Clear | Clear | Clear | Clear |
| Acetone; 20 rubs. | Pass | Pass | Pass | Pass | Pass | Pass |
| Wedge Bend, Inches | Failed at 2¾ | Failed at 2¼ | Failed at 3 | Failed at 3 | Failed at 3 | Failed at 2⅜ |
| Boiling H2O - 15' Blush | Slight | None | Slight | Slight | Slight | Slight to Moderate |
| Tape Adhesion*** | Pass | Fail | Pass | Pass | Pass | Pass |
| Pinholes-Film Failure-Acid | None | None | Severe | Slight | Severe | Severe |

TABLE 6-continued

PHYSICAL PROPERTIES OF CURED FILMS*
CONTAINING MELAMINE RESIN

Cu Sulfate -2'

*Applied over aluminum can end stock - baked 5'/190° C.
**In dispersion.
***No visual loss of film.

EXAMPLE 6

Solubilization of DER ®-664 by reacting with 85% $H_3PO_4$ in methylethylketone and neutralizing. EEW = ~1000.

11.76 grams of 85% $H_3PO_4$ (0.281 equivalents of P-OH) was added to a solution of 100 grams (0.1 equivalents of the resin) in 100 ml. of methyl ethyl ketone and the resulting mixture was refluxed (~80° C.) for 3 hours. No detectable epoxide content remained. The reaction mixture was extracted with 150 ml. of water and the extract was found by titration to contain 0.0385 equivalents of acid, or about 19% of the acid charged to the reaction. The raffinate was neutralized to a pH of about 9 with triethylamine and stripped of solvent under reduced pressure. The residual resin could be dispersed in water at a solids level of ~25%.

EXAMPLE 7

Formation of monoester groups by reaction of phosphoric acid with alcoholic hydroxyl groups in polyether epoxide (DGEBA type) resins.

To assess the extent to which alcoholic hydroxyl groups present in the resin reactant (see formula (a) in the preceding summary of the invention) may be esterified during the course of the reaction, a resinous polyol which may be represented by the following idealized formula

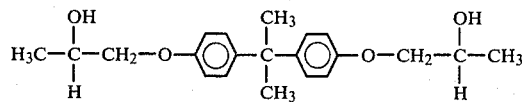

was heated at 70°, in admixture with an equal weight of dioxane and sufficient 85% $H_3PO_4$ to provide 3 P-OH per hydroxyl, for 5 hours.

Samples of the reaction mixture were withdrawn after 0.5, 1, 2, 3, 4 and 5 hours and titrated for free $H_3PO_4$, monoester and diester contents. No diester was found in any of the samples. It is evident from the data in Table 7 following that (1) esterification of alcoholic hydroxyls does occur, but at a relatively low rate, and (2) the reverse reaction (hydrolysis) appears to proceed at about the same rate, once a concentration of monoester groups corresponding to about 10% conversion of the phosphoric acid is established.

TABLE 7

| Hours Reaction Time | 0.5 | 1 | 2 | 3 | 4 | 5 |
|---|---|---|---|---|---|---|
| % $H_3PO_4$ present as such | 97.0 | 95.2 | 90.7 | 90.0 | 90.6 | 91.0 |
| % $H_3PO_4$ present as monoester groups | 3.0 | 4.8 | 9.3 | 10.0 | 9.4 | 9.0 |

EXAMPLE 8

Solubilization of higher EEW DGEBA-type resins by reaction with 85% $H_3PO_4$. EEW = 2336 or 2931. 3 P-OH hydroxyls per oxirane.

Two DGEBA-type (DER ®-668) resins having EEW's of 2336 and 2931 were made by reactions of DER ®-331 with bisphenol-A.

A. A solution of 3.46 grams of 85% $H_3PO_4$ (0.09 equiv.) in 25.92 grams of dioxane was added to a refluxing (78°-80° C.) solution of 70.03 grams (0.03 equiv.) of the 2336 resin in 130.27 grams of methyl ethyl ketone (MEK); the water content of the volatiles (including the water) was at least 0.33 wt. % (the resin and solvents were "dry" but probably not anhydrous) and the phr $H_3PO_4$ was 4.20. Refluxing was continued for 24 hours, samples of the reaction mixture being taken at 0, 2, 4, 6 and 24 hours. Each sample was analyzed for EEW, and (by direct titration) for free $H_3PO_4$, monoester and diester contents. The final mixture was neutralized to pH 9 with triethylamine (1.8 g) and 115.7 grams of deionized water gradually added with stirring. The resulting dispersion was stripped on a rotary evaporator at 70° C. under 29.5 inches of vacuum. The stripped residue was not well dispersed and was therefore redispersed by stagewise addition of MEK and restripping. A good dispersion of the neutralized product resin in water resulted.

Epoxide conversion was complete in less than 24 hours. A maximum conversion (55-60 mole %) of phosphoric acid to phosphomonoester groups was attained in the first two hours. In the following 2-4 hours, a slight decline in monoester content was accompanied by formation of enough diester to account for about 5 mole % of the phosphate present. By the end of the 24-hour reaction period, essentially all of the diester groups had been hydrolyzed. The results are summarized in Table 8 below.

B. The above procedure was repeated with the 2931 resin except that the content of water in the volatiles was (at least) 0.27 wt. % and the phr $H_3PO_4$ was 3.34.

Water addition was more gradual and better dispersion was attained before stripping; a good dispersion of the neutralized product in water was obtained on the first attempt.

70 grams (0.0239 equiv.) of the resin was dissolved in 130 grams of MEK and reacted with a solution of 2.75 grams of 85% $H_3PO_4$ (0.0717 equiv.) in 20.65 grams of dioxane. The reaction was slower but closely similar changes in the composition of the reaction mixture were observed. The results are summarized in Table 9 below.

In view of the results of the experiment described in Example 17, the apparent differences in water contents between runs A and B above are not considered very significant. Thus, the more rapid oxirane conversion in run A is attributed to the lower molecular weight (approximately 2×EEW) of the starting resin.

It is apparent from the data for the two runs that the direct reaction of water with oxiranes in higher EEW resins is quite slow in comparison to the reaction of oxiranes with $H_3PO_4$ but that formation of glycol groups by hydrolysis of phosphoester groups plays an important role in determining the equilibrium composition of the reaction product.

TABLE 8

Product Composition vs Contact Time at 80°C.
2336 EEW DGR ®-668 + 1 Mol $H_3PO_4$/Equiv. Oxirane

| Contact Time. Hrs. | EEW | % Oxirane Groups Converted | | Percent $H_3PO_4$ reporting as: | | |
|---|---|---|---|---|---|---|
| | | Total | To Glycol Groups | Free Acid | Mono-ester | Diester |
| 0 | 2336 | 0 | 0 | 100 | 0 | 0 |
| 2 | 6675 | 65.01 | 5.5 | 40.5 | 59.5 | 0 |
| 4 | 30321 | 92.30 | 26.3 | 39.1 | 55.8 | 5.1 |
| 6 | 85231 | 97.26 | — | — | — | — |
| 24 | ∞ | 100 | 40.5 | 42.0 | 56.5 | 1.5 |

Final glycol/monester group ratio for run A = 0.712.

TABLE 9

Product Composition vs. Contact Time at 80° C.
2931 EEW DER ®-668 + 1 Mol $H_3PO_4$/ Equiv. Oxirane

| Contact Time. Hrs. | EEW | % Oxirane Groups Converted | | Percent $H_3PO_4$ Reporting as | | |
|---|---|---|---|---|---|---|
| | | Total | To Glycol Groups | Free Acid | Mono-ester | Di-ester |
| 0 | 2931 | 0 | 0 | 100 | 0 | 0 |
| 2 | 6616 | 55.70 | 0 | 37.5 | 62.5 | 0 |
| 4 | 17331 | 83.09 | 35.5 | 53.6 | 45.2 | 1.2 |
| 6 | 56882 | 94.85 | — | — | — | — |
| 24 | ∞ | 100 | 39.7 | 39.7 | 60.3 | 0 |

Final glycol/monoester ratio for run B = 0.660.

EXAMPLE 9

Reaction of a 2972 EEW DGEBA-type resin with $H_3PO_4$ (3.5 phr; 3.18 P-OH/oxirane) in methyl ethyl ketone (MEK) at 100° C. Approx. 1 mol $H_2O$ per oxirane; 0.275 wt. % $H_2O$ in total volatiles.

A 2972 EEW resin was prepared by reacting DER ®-331 and bisphenol-A in the presence of the conventional ("A-1") catalyst, with a nitrogen gas purge, at a temperature which did not exceed 204° C. 122 grams of a 10% solution in dioxane of $H_3PO_4$ (14.29 grams of 85.5% $H_3PO_4$ in 107.91 g dioxane) was added to a solution of 350 grams (0.118 equiv.) of the 2972 resin in 650 grams of MEK, refluxing at 100° C. Refluxing was continued for ten hours, samples being taken for analysis at 0, 2, 3, 5, 7 and 10 hours.

50 grams of the final reaction mixture was neutralized with 1 mole of triethylamine per P—OH, charged and diluted with 50 ml of water. The resulting mixture was stripped (in a rotary evaporator at 26-27 inches of vacuum) until it thickened, then rediluted with 50 ml each of MEK and water and restripped, to yield an essentially MEK-free, aqueous dispersion. The dispersion was found (by the "Latex #40 method" described in Example 17 herein) to have a mean particle diameter of 2200 Å, but was stable.

The analytical results are given in Table 10 following. The free acid and ester contents given were obtained by the so-called "Extraction Method" described earlier herein.

In view of the results of the experiment described in Example 20 herein, the difference in EEW's between the resin used in this example and in Example 8-B is considered unimportant. Similarly, since both reactions were continued to an equilibrium condition, the difference in contact times is also not significant with regard to the final compositions of the two products. Thus, not only the higher oxirane conversion rate, but also the substantially higher glycol to monoester group ratio in the instant product resin appear to be attributable to the higher temperature (100° C. vs 80° C.) employed in the present example. This is consistent with the somewhat higher glycol to monoster ratio attained in Example II—II when the reaction temperature was 115° C., vis a vis 95° C. (The effect of the 20° temperature differential was apparently flattened at the substantially higher water to acid ratio prevailing in the latter example.)

TABLE 10

ANALYSIS OF REACTION MIXTURE FROM 2972 EEW RESIN AND 3.5 phr $H_3PO_4$

| Contact Time Hrs. @ 100° C. | EEW | Oxirane Converted | | #Ratio Glycol to Mono Ester Groups | Percent $H_3PO_4$ Reporting As: | | |
|---|---|---|---|---|---|---|---|
| | | Total | To Glycol Groups | | Free Acid | Monoester | Diester |
| Initial | 2972 | 0 | 0 | — | 100 | 0 | 0 |
| 0 | 3125 | 4.90 | | — | 65.4 | 32.6 | 2.0 |
| 2 | 34,427 | 91.37 | 39.52 | 0.699 | 50.8 | 49.0 | 0.2 |
| 3 | 40,267 | 92.62 | 40.45 | 0.762 | 50.7 | 49.3 | — |
| 5 | 51,364 | 94.21 | 42.04 | 0.794 | 50.7 | 49.3 | — |
| 7 | 69,819 | 95.74 | 43.78 | 0.779 | 50.9 | 49.1 | — |
| 10 | ∞ | 100 | 50.16 | 1.017 | 52.9 | 47.1 | — |

EXAMPLE 10

Solubilization of DER ®-667 by reaction with a condensed phosphoric acid source material. (8 P-OH per oxirane.)

A solution of 100 grams (0.05 equiv.) of DER ®-667 in 200 grams of dioxane was dripped slowly into a stirring solution of 17.8 grams (0.1 moles) of pyrophosphoric acid (4 P-OH/mole; equivalent to 13.07 phr $H_3PO_4$) in an equal weight of dioxane, the temperature of the reaction mixture being maintained at 80°-100° C. In about 0.5 hour, a soft gel had formed. Upon addition of another 270 grams of dioxane, the gel only partially dissolved, but the resulting mixture was stirrable. After another 3 hours reaction time, no unreacted epoxide could be detected (in the continuous, liquid phase). Titration of a sample of the gel phase (dissolved in a mixed solvent; 17% $H_2O$, 17% methanol and 66% methyl ethyl ketone) showed it to consist largely of DER ®-667 in which the oxirane groups had been converted to phosphodiester groups.

The reaction mixture was converted to a homogeneous liquid by adding 10 grams (0.56 mole) of water and stirring and heating for 3 hours. Titration of the final solution showed that all diester groups and P—O—P links had been hydrolyzed.

Since a good determination of the amount of free phosphoric acid could not be made by titration, an aliquot of the reaction mixture was repeatedly extracted with water and the combined extracts were titrated. The proportion of the oxirane groups (in the 667) converted to phosphomonoester groups was calculated to be 71.4% (from the difference between the amount of $H_3PO_4$ charged (as $H_4P_2O_7$) and the final free acid content in the combined extracts). The proportion of oxirane groups converted to glycol groups was then (by difference) 28.6% and the number ratio of glycol to monoester groups in the final product was 0.4.

Although the continuous liquid phase co-formed with the gel was not separately worked up, it was estimated from the titration curve for this phase that only about 10% or less of the 667-derived product it contained was diester, the rest being monoester.

Dispersions were prepared from final reaction mixture samples which had and had not been essentially freed of $H_3PO_4$ (by extraction with water). The samples were neutralized to a pH of 7.5–8.0 with triethylamine, stripped and diluted with water to a non-volatiles level of 16 wt. %. The unextracted sample gave a viscous, hazy white dispersion which had good film forming properties. The extracted sample gave a water-thin, clear blue dispersion, but the film forming properties of the latter dispersion were poor.

EXAMPLE 11

Effects of P-OH/oxirane ratio and temperature on the product obtained by reacting DER ®-667 and 85% $H_3PO_4$ in acetone.

I. Two series of reactions were carried out; one at 70° C./15 psig and the other at 115° C./60 psig. In each series, the parts of $H_3PO_4$ (100% per hundred parts by weight of DER ®-667 (EEW 1550) was varied from 0.5 to 2 or 2.5. Each reaction mixture was sampled for analysis and neutralized with triethylamine, diluted to 50% solids (volatile-free basis) with water and stripped of volatiles (acetone). The extent of dispersion and the stability of each of the resulting products was noted. Cured film properties—including contents of materials extractable with water at 250° F.—were checked for films made from certain of the dispersions obtained.

Each reaction was carried out by adding 85% aq. $H_3PO_4$ (diluted with an amount of acetone equal to the weight of 100% $H_3PO_4$ contained therein; approx. 1 mol $H_2O$ per mol acid) to a preformed solution of the DER ®-667 in an equal weight of acetone, heating the resulting solution to 70° C. (15 psig) or 115° C. (60 psig) in a closed vessel and maintaining it at temperature for a period which was either 15–20 hours (at 70° C.) or about 4 hours (at 115° C.). The vessel contents were cooled, sampled for oxirane, phosphoester and $H_3PO_4$ analyses and neutralized by adding 2 moles of the amine per mole of $H_3PO_4$ charged to the reaction. After the water was added, the neutralized mixture was stripped at atmospheric pressure to a final kettle temperature of ~100° C.

The oxirane conversions achieved, the un-neutralized product compositions and the water-dispersibility of the neutralized products is given for each of the two series of reactions in Table 11-I.

The water dispersibility of the run B and C reaction products (when enutralized) is particularly noteworthy, in that substantial amounts of unconverted epoxide remained in these products.

Although the neutralized products of runs A and E (0.24 P—OH per oxirane; glycol/monoester ratios of 8.5 and 11.9, respectively) did not give dispersion, it is believed that at least the run A product could have been successfully dispersed from MEK (as per Example 8-A) or from $CH_2Cl_2$/acetone (as per Example 16, Run 1).

The percents of the charged acid reporting as free acid and monoester in the products of each of Runs A, B and D-I were measured by each of the two analytical methods described earlier herein, but only the values for these quantities obtained by the so-called "Extraction Method" are given in Table 11 (following). The acid and ester values given for run C were not determined by the latter method but were arrived at by adjusting values determined by the so-called "Direct Titration" method, according to the differences between the free acid and monoester values obtained for Runs A, B and D-I by the two different methods of analysis.

TABLE 11-I

Effects of Low Acid to Epoxide Ratios on Composition of Products of DER ®-667/$H_3PO_4$ Reaction at 70° C. and at 115° C.

| Temp. Run | $H_3PO_4$ phr[1] | P—OH Oxirane | Final EEW | % Oxirane Reacted | % of Charged Oxirane Reporting As Ester[2] Groups | As Glycol[3] Groups | Glycol Ester Ratio | % $H_3PO_4$ to Ester[2] | Wt. % Free $H_3PO_4$ in Product[4] | Neutralized Product $H_2O$-Dispersible? |
|---|---|---|---|---|---|---|---|---|---|---|
| 70° A | 0.50 | 0.24 | 8,740 | 77 | 8.11 | 68.9 | 8.50 | 90.8 | 0.043 | No |
| B | 0.75 | 0.36 | 11,415 | 82 | 12.0 | 70.0 | 5.83 | 89.4 | 0.077 | Yes |
| C | 1.00 | 0.47 | 19,400 | 90 | 13.5 | 76.5 | 5.7 | 85[5] | 0.074[5] | Yes |
| D | 2.00 | 0.95 | >100,000 | 100 | 25.4 | 74.6 | 2.94 | 71.1 | 0.062 | Yes |
| 115° E | 0.5 | 0.24 | 300,000 | 100 | 7.69 | 91.3 | 11.9 | 86.1 | 0.080 | No |
| F | 1.0 | 0.47 | 156,000 | 100 | 17.8 | 81.2 | 4.57 | 90.2 | 0.10 | Yes |
| G | 1.4 | 0.66 | >100,000 | 100 | 23.3 | 76.7 | 3.29 | 86.1 | 0.19 | Yes |
| H | 1.8 | 0.83 | 48,000 | 96 | 25.2 | 74.8 | 2.97 | 77.9 | 0.35 | Yes |
| I | 2.5 | 1.19 | >100,000 | 100 | 25.4 | 74.6 | 2.94 | 54.0 | 1.06 | Yes |

[1]Parts $H_3PO_4$ (100%) per hundred parts DER ®-667. (0.75) phr = 0.356 P—OH per oxirane.)
[2]Monoester (no diester present).
[3]Calculated as % oxirane converted, minus (2).
[4]Solvent and water-free basis.
[5]Adjusted. See paragraph before table.

Cured films were prepared from formulated dispersions of TEA-neutralized products B and C and evaluated. 20 grams each of the unneutralized products was dissolved in 8.0 grams of acetone and diluted with 4 grams of $CH_2Cl_2$ (33.3% $CH_2Cl_2$/66.7% acetone). 0.3 and 0.4 grams, respectively, of TEA were added to the solutions of B and C, and 35.6 and 20.0 grams, respectively, of water. The stripped dispersions were each combined, in the amount of 10 grams, with 1.0 gram of a 50% solution of CYMEL ®-303 in Hexyl Cellosolve, 1.0 grams of Butyl Cellosolve and 0.05 grams of a 10% solution of triethanol amine in water. The resulting B and C formulations were respectively diluted to 30 and 42 wt. % solids with water and films were drawn from them with wire wound rods on standard tin-free steel coupons, cured and tested—as summarized in Table 12, following.

TABLE 12

FILM PROPERTIES OVER TIN FREE STEEL

| Formulation | B | C |
|---|---|---|
| Wire Wound Rod | #18 | #12 |
| Mg/in$^2$ | 6.0 | 5.7 |
| Bake | 3' @ 200° C. | 3' @ 200° C. |
| Acetone Resistance Before H$_2$O Exposure | >100 D.R.[1] | >100 D.R. |
| Flexibility before H$_2$O Exposure (40 in-lb wedge-Bend) | 30–35% Failure over 4" | 30–35% Failure over 4" |
| Acetone Resistance After 30' @ 212° F. H$_2$O | >100 D.R.[1] | >100 D.R. |
| After 2 HRS. @ 250° F. H$_2$O | Fail @ 15 | Fail @ 3 |
| Adhesion (cross-hatch & tape pull off) | | |
| After 30' @ 212° F. H$_2$O | No film removed | No film removed |
| After 2 Hrs. @ 250° F. H$_2$O | No film removed | No film removed |
| Blush | | |
| After 30' @ 212° F. H$_2$O | None | Very slight |
| After 2 Hrs. @ 250° F. H$_2$O | Slightly whitened not softened | Whitened and softened |

NOTE:
[1] Double rubs.

To 50% solids dispersions of the triethylamine-neutralized products H and I (Table 11) were added 20 phr of CYMEL ®-303 each, and 2.75 and 15.25 phr, respectively, of triethanolamine. Films were drawn from the resulting formulations with a No. 12 wire-wound rod on 4"×12"×0.015" stainless steel panels. The films were cured five minutes at 200° C. and the panels were cut into 2"×3" plates, which were then immersed in boiling water (10 ml per in$^2$ of film area, in tared 600 ml dishes) at 250° F. (~1537 mm Hg) for 2 hours. The panel pieces were removed, the water evaporated and the weight of the residual solids determined. The amounts of solids extracted corresponded to 0.090 and 0.124 mg/in$^2$ respectively for films H and I. These amounts are well below the maximum level of 0.5 mg/in$^2$ generally considered acceptable for approved food can linings. The water-extracted films were examined for blushing. Slight blushing was exhibited by film I and none by film H.

II. Reaction of 1742 and 1778 EEW DER ®-667's with 1 phr H$_3$PO$_4$ at 95° C. and 115° C. in CH$_2$Cl$_2$/acetone (27 wt. % CH$_2$Cl$_2$) containing 0.55% water.

a. In a 2-liter Parr 4500 bomb reactor were mixed 500 grams of the 1742 EEW resin (0.28703 equiv. oxirane), 135 grams CH$_2$Cl$_2$, 365 grams acetone and 1.94 grams water. To the resulting solution was added 5.83 grams of 85.7% H$_3$PO$_4$ (5 g H$_3$PO$_4$; 0.83 g H$_2$O), making the H$_2$O/H$_3$PO$_4$ ratio 3.023 and the P-OH/oxirane ratio 0.5333. The bomb contents were agitated at 95° C. (50 psig) for 13 hours, analytical samples being withdrawn at 0, 2, 4, 6 and 13 hours.

b. An otherwise closely comparable reaction was carried out with the 1778 EEW resin at 115° C. (80 psig). Complete oxirane conversion and equilibration between mono- and diester contents (no triester) was attained in 4 hours.

The compositions (as determined by the extraction method of analysis) of the two (a and b) reaction products are given in Table 11-II, following.

TABLE 11-II

Effect of Temperature on Reaction of DER ®-677 with 1 phr H$_3$PO$_4$ in CH$_2$Cl$_2$ Acetone

| Reaction Temperature °C. | Wt. % Free H$_3$PO$_4$ in Volatiles | % Oxirane Converted To | | | Ratio of Glycol to Monoester | Particle Size[1] °A |
|---|---|---|---|---|---|---|
| | | Monoester | Diester | Glycol Groups | | |
| 95 | 0.1080 | 15.22 | 0.23 | 84.55 | 5.56 | 1280 |
| 115 | 0.0854 | 13.91 | 3.31 | 82.78 | 5.95 | 1520 |

NOTE:
[1] Wt. average diameter of particles in solvent-free dispersion in water of neutralized reaction product.

A portion of reaction mixture a was neutralized with one mole of TEA per P-OH, diluted with water and stripped at 1 atm. pressure to a kettle temperature of 100° C., to yield a stable 53% solids dispersion in water having a weight average particle size of 1280 Å, by light scatter measurements (see Example 17, part B).

A portion of reaction mixture b, neutralized, diluted and stripped (to ~50% solids) in essentially the same manner, gave a dispersion having a mean particle size of 1520 Å.

The two products were each further water-thinned and formulated with 8.75 parts by weight of CYMEL ®303 per hundred parts of total solids (including the CYMEL ®), 0.1 part of triethanolamine per hundred parts CYMEL ® and hexyl carbitol, 18 vol. % of total volatiles; the non-volatiles content of each formulation was 30 wt. % (such formulations, comprising hexyl carbitol, are the invention of B. J. Dooley, a coworker of the present Applicant).

Films drawn from the formulations on tin-free steel with a #18 wire-wound rod were cured 2 minutes at 200° C. and subjected to the standard film quality tests listed in Table 11-III, below. In addition, the viscosity (Brookfield, 100 rpm, #4 spindle) of each formulation was determined.

The properties of the cured films were the same, except that the flexibility of the lower temperature resin (product a) was outstandingly superior.

TABLE 11-III

FORMULATION AND CURED FILM PROPERTIES

| Test | Product of Reaction at | |
|---|---|---|
| | 95° C. | 115° C. |
| Viscosity, cps | 630 | 250 |
| Acetone double-rubs | >100 | >100 |
| Wedgebend Failure | 17% | 31% |
| Blush after 30' in boiling water | pass | pass |
| Adhesion after 30' in boiling water | pass | pass |

EXAMPLE 12

Neutralization of DER ®667/H$_3$PO$_4$ Reaction Products with Various Types of Nitrogen Bases.

A. Different 100 gram portions of the last product listed in Table 11-I (preceding example) were neutralized with different nitrogen bases in order to compare the extents of dispersion attained by the salified (neutralized) products.

Each 100 gram portion of the acidic resin was dissolved in an equal weight of acetone in a 3-necked, round bottom flask set in a thermostatically controlled heating mantle and fitted with a reflux condenser, a pH probe (connected to an automatic titrator/recorder) a motor-driven, blade-type stirrer, a thermocouple and a titrant feed line from the titrator. Water (about 20 grams) was added to the stirring solution until incompatibility (phasing) was observed. The temperature was raised to 50° C. and the N-base (NH$_4$OH or an amine) was added (from the titrator) at a rate of about 0.33 ml/minute while observing the pH vs titrant-added curve plotted by the recorder. When the first inflection point in the curve was passed, the addition of titrant was stopped. About 50 grams more of water was added, the temperature was restored to 50° C. and the appearance and viscosity of the flask contents were noted. Titrant addition (at the same rate) was resumed, continued through the second inflection point and stopped. The flask contents were again observed and then stripped of acetone. The qualities of the residual products, as dispersions, were then judged.

The bases used and the characters of the products after the second titration breaks and after stripping are given in Table 13.

(TEA) and dimethylaminomethylpropanol (each), were compared.

Acetone/CH$_2$Cl$_2$ solutions of product F (Table 11, Example 11), each comprising 1 part by weight of the resin, 1 part of acetone and 0.25 part of CH$_2$Cl$_2$, were made up. To each solution was added 2 moles of TEA or DMAMP per mole of H$_3$PO$_4$ charged to the resin preparation. Water was then added, until the mixture was readily pourable and the weight of water added was at least equal to the weight of the unneutralized resin. The mixture was observed, stripped in vacuo and evaluated as an aqueous, solvent-free dispersion.

The same procedure was followed with product H (Table 11, Example 11) except that no CH$_2$Cl$_2$ was present in the solutions (50% solids in acetone) neutralized. The amounts of amine leachable with boiling water were determined for cured films prepared from the latter (H) dispersions (formulated with CYMEL ®-303 and triethanolamine). Clean, 0.015", #302 stainless steel panels coated with the formulated dispersions and baked 5 minutes at 200° C. had cured film weights of 4.3–4.7 mg/in$^2$. They were immersed in water (1 ml/in$^2$ of film) and maintained at 212° F. for 2 hours. The amine contents in the resulting extracts were determined by ion chromatography and divided by 10 to obtain the contents at the standard test level of 10 ml of extractant per in$^2$ of film.

The results for products F and H are given in Table 14.

TABLE 13

DISPERSION PROPERTIES OF PRODUCTS OBTAINED BY NEUTRALIZING DER ®-667/2.5 phr H$_3$PO$_4$ RESINS WITH DIFFERENT N-BASES

| N-Base | Viscosity After 2d Break | Viscosity After Stripping | Appearance After 2d Break | Appearance After Stripping | Dispersibility of Stripped Product In Water |
|---|---|---|---|---|---|
| NH$_4$OH (28% aqueous) | High[1] | Dilatent[2] | Uniform Opaque White | Grainy Opaque White | Poor |
| Dimethylaminoethanol | " | " | Uniform Opaque White | Grainy Opaque White | " |
| Aminomethyl propanol | Very High | " | Flocculated | Flocculated | Nil |
| Dimethylaminomethyl-propanol (80% aqueous) | High | Medium | Translucent Blue | Bluish-White Opaque | Good |
| Triethylamine | " | Low | Translucent Blue | Translucent Blue | Excellent |
| n-Butyl amine | " | Dilatent | Uniform Opaque White | Grainy Opaque White | Poor |
| Piperidine | " | High | Uniform Opaque White | Grainy Opaque White | " |

NOTES:
[1]High = ~10,000 cps Low = ~100 cps
[2]Not after further dilution with water.

B. The dispersibilities of DER ®-667 reaction products with 1 phr H$_3$PO$_4$ and 1.8 phr H$_3$PO$_4$, when neutralized in acetone/CH$_2$CL$_2$ solution with triethylamine

TABLE 14

COMPARISON OF DMAMP AND TEA NEUTRALIZED DER ®-667/(1.0 AND /1.8 phr) H$_3$PO$_4$ RESIN DISPERSIONS

| Amine | phr[3] H$_3$PO$_4$ | Viscosity After 2d Break | Viscosity After Stripping | Appearance After 2d Break | Appearance After Stripping | Dispersibility in Water | Concentration of amine in water extract of cured film:ppb[4] |
|---|---|---|---|---|---|---|---|
| DMAMP[1] | 1.0 | High | Dilatent | Creamy, Opaque White | Grainy, Opaque White | Poor | — |
| " | 1.8 | " | Low-Medium | Creamy, Translucent Blue | Bluish-White Opaque | Good | 260 |
| TEA[2] | 1.0 | Low | Low | Creamy, Translucent Blue | Bluish-White Opaque | " | — |
| " | 1.8 | High | " | Creamy, Translucent | Bluish-White Opaque | " | 770 |

TABLE 14-continued

COMPARISON OF DMAMP AND TEA NEUTRALIZED
DER ®-667/(1.0 AND /1.8 phr) H₃PO₄ RESIN DISPERSIONS

| Amine | phr[3] H₃PO₄ | Viscosity After 2d Break | Viscosity After Stripping | Appearance After 2d Break | Appearance After Stripping | Dispersibility in Water | Concentration of amine in water extract of cured film:ppb[4] |
|---|---|---|---|---|---|---|---|
| | | | | Blue | | | |

NOTES:
[1] 2-Dimethylamino,2-methyl,1-propanol.
[2] Triethylamine.
[3] Parts H₃PO₄ charged per hundred parts DER ®-667 (Example 12).
[4] Parts per billion in extract of film containing ~20 wt. % CYMEL ®-303.

EXAMPLE 13

Effects of H₃PO₄ content and glycol to ester group ratio on water dispersibility of TEA-neutralized DER ®-667/H₃PO₄ reaction products.

Solution 1

A high ester-content resin was prepared by refluxing at 80° a solution in MEK (methyl ethyl ketone) of DER ®-667 (EEW ~1550) and 1 mole of 100% H₃PO₄ (3 P-OH) per equivalent of epoxide, the acid (6.3 phr) having been formed in situ by reaction of pyrophosphoric acid and water in 1:1 mole ratio. The resin was precipitated from the reaction mixture by addition of several volumes of water, separated, extracted with more water, redissolved in MEK and analyzed by direct titration. The glycol to phosphomonoester ratio of the washed resin was about 0.5 and its content of free H₃PO₄ was 1.69 wt. %. (No diester present.)

Solution 2

A hydrolysis product was prepared by refluxing a solution of DER ®-667 in MEK with enough aqueous 10% HCl to provide more than 1 mole of water per equivalent of epoxide. The resulting resin was precipitated and washed as above and redissolved in MEK. Titration of a sample of the solution showed no unconverted epoxide left and all oxirane groups were assumed to have been converted to glycol groups.

A. Aliquots of solutions 1 and 2 were mixed in several different proportions to provide mixed product solutions having glycol to ester ratios ranging from ½ to 10/1 and free H₃PO₄ contents of from 1.69 to 0.24%. Aqueous mixtures were prepared from portions of each of the latter solutions neutralized with triethylamine (to the second inflection point recorded by an automatic recorder/titrator), diluted with 25 phr of CH₂Cl₂, emulsified by stirring with 100 phr of water, and stripped to 50 wt. % solids in vacuo. The resulting mixtures were evaluated as dispersions.

B. Other aqueous mixtures, at a final solids level of 15 wt. %, were prepared from portions of solution 1 by neutralizing them (as above) with TEA, thinning with CH₂Cl₂, and stirring in water. Different amounts of triethylammonium phosphate (NHEt₃⊕, H₂PO₄⊖), diluted to 10 wt. % with water, were added to each portion before it was stripped. The resulting mixtures were observed for "salting out" effects on polymer dispersibility.

The results obtained are given in Table 15 and indicate that:

(1) Solvent-free, aqueous dispersions of at least borderline stability (at a solids level of 15 wt. %) can be prepared by neutralization of DER ®-667/H₃PO₄ reaction products having a glycol/monoester ratio of 0.5 and comprising as much as 45.9 wt. % (~85 phr) of free H₃PO₄.

(2) Lower solids levels and lower glycol to ester ratios enable the aqueous, neutralized systems to tolerate higher total phosphate (salified free acid and ester P—OH) contents. However, at a given solids level, there is a limiting phosphate concentration at which salting out of the resinous component begins and a stable dispersion cannot be obtained no matter how low the glycol to ester ratio.

TABLE 15

PHOSPHATE (SALIFIED P-OH) TOLERATION AS A FUNCTION
OF GLYCOL/ESTER RATIO IN AQUEOUS DISPERSIONS
OF DER ®-667/H₃PO₄ REACTION PRODUCTS

| Mixture No. | Weight % Free H₃PO₄[1] | Total % by wt. PO₄≡ | Glycol to Ester Ratio | H₂O Dispersibility of Neutralized Mixture | Maximum Total Phosphate Content for Stable Dispersion @ 50% Solids |
|---|---|---|---|---|---|
| A - 1 | 1.69 | 5.13 | 1/2 | Excellent | 7.0 % |
| 2 | 1.29 | 3.90 | 1/1 | " | " |
| 3 | 0.87 | 2.63 | 2/1 | Good | 6.0 |
| 4 | 0.53 | 1.60 | 4/1 | " | 3.0 |
| 5 | 0.38 | 1.15 | 6/1 | Not dispersible | <1.15 |
| 6 | 0.29 | 0.89 | 8/1 | " | <0.89 |
| 7 | 0.24 | 0.73 | 10/1 | " | <0.73 |
| | | | | H₂O Dispersibility at 15% Solids | |
| B - 8 | 31.2[2] | 33.6 | 1/2 | Good | |
| 9 | 36.1 | 38.3 | " | " | |
| 10 | 41.0 | 42.1 | " | " | |
| 11 | 45.9 | 47.8 | " | Borderline (settled overnight) | |
| 12 | 50.9 | 52.6 | " | Not dispersible | |

[1] Volatiles-free basis.
[2] Amount acid equivalent to the NHEt₃⁺, H₂PO₄⁻ present.

EXAMPLE 14

Utility of Neutralized Reaction Products of DER ®-667 with $H_3PO_4$, as dispersants for DGEBA epoxides having EEW's of up to ~13,000.

A. A "high" ester content DER ®-667/$H_3PO_4$ product was prepared by reacting DER ®-667 (EEW ~ 1550), with 1 mole of $H_3PO_4$ (as 99% aq. $H_3PO_4$) per equiv. of epoxide, in methyl ethyl ketone at 80° C. for 15 hours; (6.3 phr acid). No unconverted epoxide remained and the glycol to ester ratio was 34/66=0.52. This product was mixed with successively lower amounts of DER ®-684 solution (40 wt. % solids in MEK) and each of the resulting mixtures was neutralized with two equivalents of triethylamine, diluted with 25 phr of methylene chloride and mixed with 100 parts of water per 100 parts of total resins. The stripped products (emulsion) contained 50 wt. % total solids and were evaluated as dispersions. The results are given in Table 16.

TABLE 16
DISPERSIBILITY IN WATER OF NEUTRALIZED MIXTURES OF DER ®-684 AND DER ®-667/6 phr $H_3PO_4$ REACTION PRODUCT

| phr DER ®-684 | phr $PO_4$ | Dispersion Quality |
| --- | --- | --- |
| 60 | 2.0 | Dispersion grainy, settled on standing. |
| 50 | 2.6 | Borderline acceptability, slight settling noted. |
| 40 | 3.1 | Borderline acceptability, slight settling noted. |
| 20 | 4.1 | Good dispersion. No settling. |

B. 680 grams of a 40 wt. % solution of DER ®-684 in MEK was heated at 78° C. for 24 hours with 3.72 grams of pyrophosphoric acid and the amount (0.38 gram) of water required to convert it to 100% $H_3PO_4$ (~1.5 phr). The EEW of the resin never rose above 50,000 (~74% oxirane conversion) and the (TEA) neutralized final product did not give a dispersion with water. When the 50,000 EEW product resin was substituted for DER ®-684 in the mixtures of part A above, somewhat poorer dispersibility was observed.

The dispersed mixtures obtained in the experiment of part A, at DER ®-684 contents of 50 phr and less, exemplify a unique and superior embodiment of the present composition invention. Those skilled in the art will appreciate the advantages, in terms of cured coating properties, conferred by the presence of a DGEBA resin component having an (average) molecular weight of about 26,000. Further, it is apparent from the quite slow oxirane conversion rate observed in the experiment of part B that most or all of the DER ®-684 oxirane groups are present as such in the −684 dispersions, as formed. The latter groups would not be expected to remain unconverted for an indefinite period of time in the presence of both water- and acid-hydrolyzing amine phosphate groups (even though the DER ®-684 is dispersed, rather than dissolved). However, aqueous dispersions of neutralized DER ®-684 (as such or reacted with $H_3PO_4$) and DER ®-667/$H_3PO_4$ reaction product mixtures appear to be properly regardable as highly novel, oxirane-comprising compositions of matter.

EXAMPLE 15

Reduction of Free Acid Content in Reaction Product of High EEW DGEBA Resin With ~6 phr $H_3PO_4$, to Improve Dispersibility.

A solution of 95 grams (0.0198 equiv.) of DER ®-669 (EEW 4800) and 5.88 grams 85% $H_3PO_4$ (5.26 phr $H_3PO_4$; 7.73 P-OH per oxirane) in MEK was refluxed at 80° C. for 15 hours. The reaction mixture was cooled and sampled for analysis by direct titration.

Unreacted oxirane content, none;
Oxirane converted to phosphomonoester, 40%;*
Oxirane converted to glycol, 60%;
Glycol/ester group ratio, 3/2;
Free $H_3PO_4$ in product, 4.31 grams or 4.27 wt. % of non-volatiles present.

* A somewhat higher monoester content and lower glycol group content would be expected if the reaction mixture had been analyzed by the extraction method, thus resulting in a lower value for the calculated glycol to monoester group ratio.

The reaction mixture was divided into portions. One portion was neutralized with triethylamine to a pH of 7, diluted with water and stripped. The stripped material was not a stable dispersion.

A second portion was mixed with enough water (an equal volume of water) to precipitate the polymer. The liquid phase was decanted and the precipitate triturated with more water, which was then also decanted. The polymer was taken up in MEK and the solution sampled for analysis. 30% of the free acid was found to have been removed by washing; the $H_3PO_4$ present constituted approximately 3 wt. % of the resinous product. A stable, opaque, non-grainy dispersion (50% solids) was obtained by neutralizing this product to pH 7 with triethylamine, diluting it with water and stripping off the MEK.

EXAMPLE 16

Effects of Reaction Medium on Reaction Rate and Product Composition; DER ®-667 and 1 phr $H_3PO_4$ (0.474 P-OH/oxirane) per mole $H_3PO_4$.

1 phr of $H_3PO_4$ (as 85% aq. acid) each was added to solutions of DER ®-667 (EEW ~1550) in equal weights of reaction media consisting of acetone diluted with increasing amounts of $CH_2Cl_2$. The acid-containing solutions were heated 4 hours in closed vessels under autogeneous pressures) at 117°–120° C.; all oxirane conversions were essentially complete. The final reaction mixtures were sampled for analysis by the extraction method.

Each product mixture was neutralized with 2 equivalents of triethylamine per equivalent of P—OH charged, diluted with water and stripped. The stripped mixtures were evaluated as dispersions (50% solids).

The reaction medium and final product compositions, and the dispersibilities of the neutralized products are given in Table 17. It will be seen that the effect on product composition of increasing $CH_2Cl_2$ content in the solvent, within a 0–27% range, was not significant. However, it was found that the presence of $CH_2Cl_2$ during dispersion of the run 1 reaction product was essential to getting a non-grainy dispersion.

TABLE 17

EFFECT OF REACTION MEDIUM COMPOSITION ON GLYCOL AND ESTER GROUP CONTENTS OF DER ®-667/1 phr $H_3PO_4$ REACTION PRODUCT

| Run No. | Wt. %'s DMK[1]/$CH_2Cl_2$ | Reac. Temp. °C. | % $H_3PO_4$ charged which reported as $H_3PO_4$ | % $H_3PO_4$ charged which reported as Diester and Monoester | % Oxiranes Converted To Monoester and Diester | % Oxiranes Converted To Glycol | Glycol Esters[2] Ratio | Dispersion of Neutralized Product |
|---|---|---|---|---|---|---|---|---|
| 1 | 100/0 | 120 | 9.5 | 87.1 | 14.2 | 85.8 | 6.0 | Good[3] |
| 2 | 80/20 | 120 | 12.8 | 89.4 | 15.4 | 84.6 | 5.5 | Excellent[5] |
| 3 | 75/25 | 118 | 6.6 | 85.8 | 14.0 | 86.0 | 6.1 | Good |
| 4 | 73/27 | 118[4] | 8.1 | 85.3 | 15.4 | 84.6 | 5.5 | Good |

NOTES:
[1]Acetone
[2]Mono- and di-esters; ratio would be somewhat higher for monoester only.
[3]Reaction mixture diluted with $CH_2Cl_2$, before neutralization, to $DMK/CH_2Cl_2$ ratio 75/25.
[4]85 psig.
[5]Mean particle size <1700Å; (see Example 17-B).

An otherwise essentially identical reaction was carried out in 75 wt. % $CH_2Cl_2$/25% acetone. After 26 hours at 60° C., the EEW of the resin was 31,000 (corresponding to about 95% conversion), the free acid content was 25% of the charged acid and 75% of the acid charged reported as diester. This product of course could be hydrolyzed to a dispersible mixture of monoester and glycol group-containing species.

EXAMPLE 17

Effects of Water Present During Reaction of DER ®-667's of different EEW's with different amounts of $H_3PO_4$.

A. Five solutions of water in acetone, containing 5, 10, 20, 30 and 40 wt. % of water, were made up and mixed overnight with DER ®-667 (EEW ~1800) in a 1:1 ratio by weight. Only the solutions originally containing 5 and 10% of water dissolved the resin. The 20% solution gave an emulsion and the other two mixtures were simply slurries.

To each of the two resin solutions was added 2.5 phr of $H_3PO_4$, (1.4 P—OH/oxirane) as a mixture of 85% aq. $H_3PO_4$ with a weight of acetone equal to its 100% $H_3PO_4$ content. The resulting reactant mixtures were heated at 70° C. (14 psig) until (~25 hours) oxirane conversion was essentially complete and were cooled and sampled for analysis by direct titration.

An otherwise essentially identical reaction was carried out in 100% acetone at the same acid level (2.5 phr).

The products obtained by neutralizing each of the three reaction mixtures to pH 9 with triethylamine, diluting with water (to ~40 wt. % solids, solvent-free basis), and stripping, were all low viscosity, stable dispersions.

Water contents, oxirane conversions vs. time and compositions of the unneutralized reaction mixtures are given in Table 18. (The glycol to ester ratios given are presumably somewhat higher than if they had been based on free acid and ester contents determined by the extraction method of analysis.) It will be seen that water to acid mole ratios of up to 22.2 did not result in such high glycol/ester ratios and/or free acid levels as to render the neutralized product indispersible. It is also apparent that the relative amounts of free acid, ester and glycol groups present were not affected until the water content exceeded 5 wt. %.

TABLE 18

EFFECTS ON OXIRANE CONVERSION AND PRODUCT COMPOSITION OF WATER PRESENT DURING REACTION OF DER ®-667 (EEW 1800) AND 2.5 phr $H_3PO_4$ IN ACETONE AT 70° C.

| %'s $H_2O$/DMK[1] in Solvent | Resin Solution Grams DER ®-667 | Resin Solution Grams DMK[1] | Resin Solution Grams $H_2O$ | Acid Solution Grams $H_3PO_4$ | Acid Solution Grams DMK[1] | Acid Solution Grams $H_2O$ | Total Moles $H_2O$ Per Mole $H_3PO_4$ | Wt. % $H_3PO_4$ in Product[4] | % Oxirane Finally Converted: Total | % Oxirane Finally Converted: To Mono Ester | Mole % Acid Reporting as $H_3PO_4$ | Glycol Ester Ratio[2] |
|---|---|---|---|---|---|---|---|---|---|---|---|---|
| 0/100 | 200 | 200 | 0 | 5 | 5 | 0.88 | 0.90 | 0.9 | 100 | 36.0 | 35 | 1.78 |
| 5/95 | 200 | 190 | 10 | 5 | 5 | 0.88 | 11.84 | 0.9 | >99 | 36.3 | 34.6 | 1.75 |
| 10/90 | 50 | 45 | 5 | 1.28 | 1.28 | 0.23 | 22.2 | 1.4 | 93[3] | 30.3 | 55.5 | 2.30 |

NOTES:
[1]Acetone
[2]% oxirane to glycol taken as total oxirane conversion minus % converted to ester.
[3]Probably lower than the actual conversion. The analytical method used is not considered accurate at such high water contents.
[4]Estimated as % acid reporting as such, times wt. $H_3PO_4$ charged and divided by wt. DER ®-667 charged.

B. The effects of reacting 1587 and 1746, EEW DER ®-667 resins with 1 phr $H_3PO_4$ (~0.5 P—OH/oxirane) in acetone/water solutions containing from about 0 to about 5 wt. % water (total) were assessed as follows.

Portions A, B, C and D of a 1587 EEW DER ®-667 resin (water content 0.15 wt. %) weighing 301, 300, 302 and 300 grams respectively, were dissolved in 300, 297, 294 and 285 grams, respectively, of acetone (0.004 wt. % $H_2O$). Phosphoric acid was added to the resulting solutions as follows: to A, 3.00 grams 100% $H_3PO_4$; and to each of B, C and D, 3.50 grams of 85.7% aq. $H_3PO_4$. Water was then added as follows to give the overall water contents stated: A, 0 grams, 0.154% ("0%") water; B, 2.47 g, 1.14%; C, 5.47 g, 2.14% and D, 14.47 g, 5.14%. Each solution was placed in a 2 liter, Parr 4500 bomb reactor which was then sealed, pressurized to 100 psig with dry Argon and heated, with agitation, to 115° C. After 4 hours at temperature (115°–120° C.), the reaction mixture was rapidly cooled to 40° C. and analyzed for EEW and (by the extraction method) for free $H_3PO_4$ and phosphoester contents.

In a similar manner, portions E, F and G of a 1746 EEW DER®-667 resin (0.28 wt. % $H_2O$) weighing 500 grams each were dissolved in 490.6 grams each of acetone (0.004 wt. % $H_2O$) and 5.83 grams of 85.7% aq. $H_3PO_4$ was added to each of the resultant solutions. 5.73 and 10.87 grams of water, respectively, were added to the acidified solutions E and F, resulting in respective overall water contents (based on volatiles only) of 1.601 and 2.605 percents. Each solution was reacted 4 hours at 115°–120° C., and analyzed, as above.

Free acid, (mono-+diester) and triester vs % $H_2O$ curves were plotted for each of the 1587 and 1746 EEW resin-derived reaction mixtures. The values given in Table 19 were read off from the curves and used to calculate the glycol to monoester group ratios given in the latter table. It is of interest to compare the glycol/-ester ratio (1.75) obtained with the 1800 EEW resin (part A of this example), at 70° C. with a water content of 5% and 1.4 P—OH per oxirane, with the ratio of 5.65 obtained for the 1746 EEW resin at 115°–120° C. with 5% water and 0.5 P—OH per oxirane. Again, the effect of increasing water content on product composition was not very substantial, particularly for the higher EEW starting resin.

The severalfold higher glycol/ester ratios obtained, at $H_2O$ contents of 0–5%, with the 1746 EEW resin (in 4 hrs. at 115° C.) than with the 1800 EEW resin (in 25 hrs. at 70° C.) are believed attributable primarily to the substantially higher $H_2O/H_3PO_4$ ratio employed at the higher temperature.

The viscosity of each unneutralized 4-hour reaction mixture was determined (sample diluted with acetone to 40%, nonvolatiles) in a Gardner-Fenske bubble viscometer. A viscosity vs initial % $H_2O$ curve was plotted for the reaction mixtures derived from the 1587 EEW resin and the viscosity values given in Table 19 were read off from this curve. (The viscosities of the corresponding reaction mixtures derived from the 1746 EEW resin varied with their initial water contents in essentially the same manner.)

A portion of each 4-hour reaction mixture was neutralized and dispersed by the method (a, b or c) indicated (see description following the table) and the mean particle size for the dispersion determined by the so-called "Latex Method #40", using green light (see description following Table 19). Particle size vs % $H_2O$ curves were plotted for each resin and the values given in the table read off from those curves. The dispersions obtained from the "anhydrous" products ("0% $H_2O$") contained a sufficient proportion of larger particles to exhibit some instability upon standing; thus, such dispersions with mean particle diameters above about 2200 Å, although not without utility as coating materials, are less preferred. The particle sizes (1700 Å or less) of the products made from the 1587 EEW resin at 2–4% water and from the 1746 EEW resin at 2–3% water are preferred for DER®-667-derived dispersions. That is, dispersions of such products having mean particle diameters of about 1700 Å or less exhibit better handling and application properties and give better cured film properties.

TABLE 19

| EFFECTS OF WATER CONTENT | | | | | | |
|---|---|---|---|---|---|---|
| EEW | | | 1587 | | | |
| % $H_2O$ | 0 | 1 | 2 | 3 | 4 | 5[5] |
| mmoles/g solids | | | | | | |
| Free $H_3PO_4$ | .0026 | .0066 | .0088 | .0103 | .0115 | .0125 |
| Monoester[1] | .0630 | .0730 | .0820 | .0830 | .0820 | .0780 |
| Triester | .0036 | .0023 | .0013 | .0010 | .0010 | .0010 |
| Equiv. Oxirane per 100 g. resin | | | | | | |
| Charged | .0630 | .0630 | .0630 | .0630 | .0630 | .0630 |
| Converted to Monoester | .0063 | .0073 | .0082 | .0083 | .0082 | .0078 |
| Converted to Triester | .00108 | .00069 | .00039 | .00030 | .00030 | .00030 |
| Converted to Glycol[2] | .0556[6] | .0550 | .0544 | .0544 | .0545 | .0549 |
| Glycol/Monoester | 8.83[4] | 7.54 | 6.64 | 6.55 | 6.65 | 7.04 |
| Reac. Mixture Viscosity cps | 168 | 95 | 74 | 73 | 74 | 80 |
| Method of Dispersion | a | a | a | — | — | a |
| Mean Particle Diam. Angstroms | 2280 | 2200 | 1450 | 1425 | 1550 | 1730 |
| EEW | | | 1746 | | | |
| % $H_2O$ | 0 | 1 | 2 | 3 | 4 | 5 |
| mmoles/g solids | | | | | | |
| Free $H_3PO_4$ | .0077[3] | .0097 | .0115 | .0135 | .0147[3] | .0150[3] |
| Monoester[1] | .0800[3] | .0860 | .0880 | .0890 | .0880[3] | .0860[3] |
| Triester | .0020[3] | .0030 | 0 | 0 | 0[3] | 0[3] |
| Equiv. Oxirane per 100 g. resin | | | | | | |
| Charged | .0572 | .0572 | .0572 | .0572 | .0572 | .0572 |
| Converted to Monoester | .0080 | .0086 | .0088 | .0089 | .0088 | .0086 |
| Converted to Triester | .00060 | .00090 | 0 | 0 | 0 | 0 |
| Converted to Glycol[2] | .0486 | .0477 | .0484 | .0483 | .0484 | .0486 |
| Glycol/Monoester | 6.08[4] | 5.55 | 5.50 | 5.43 | 5.50 | 5.65 |

TABLE 19-continued
EFFECTS OF WATER CONTENT

| Reac. Mixture Viscosity cps | — | — | — | — | — | — |
|---|---|---|---|---|---|---|
| Method of Dispersion | a | a | a,b,c | a | — | — |
| Mean Particle Diam. Angstroms | 2280[3] | 1755 | 1600 | 1730 | 1960[3] | 2160[3] |

NOTES:
[1]Actually monoester + diester, but proportion of diester negligible in all but anhydrous mixtures.
[2]By difference; all charged oxirane converted.
[3] Extrapolated.
[4]Minimum ratio. If diester content substantial, monoester content would be lower and ratio higher.
[5]25.9 moles $H_2O$/mol $H_3PO_4$.
[6]88.25% of oxiranes charged.

Dispersion Methods

Method a

The ester solution was weighed into a 250 ml round-bottomed flask equipped with an air-driven stirrer and a water addition port. Acetone was then added to bring the solution to 50% NV*, after which $CH_2Cl_2$, 25% based on resin solids, and triethylamine, 3 moles per mole measured total $H_3PO_4$, were added. The solution was mixed 15 minutes at 600 rpm, after which water was added over a 0.5 hr. period. The weight of added water equaled the resin solids weight. Samples were taken when $\frac{1}{4}, \frac{1}{2}, \frac{3}{4}$, and all the water had been added and visually compared for viscosity and transparency. The final dispersion particle sizes were compared by latex method #40 with green light.
* Non-volatiles.

Method b

In this method, acetone was not added to bring the ester solution to 50% NV. All other steps were identical to method A.

Method c

In this method, $CH_2Cl_2$ was added to a level of 30% based on resin solids. All other steps were identical to Method a.

The resulting dispersions were not stripped of solvents, but other work has shown that this could have been done without experiencing substantial increases in particle size or development of dispersion instability.

Particle Size Determination

A drop of the dispersion is mixed with 250 ml of distilled water. 125 ml of the mixture is rediluted with water to 250 ml volume, and the latter step is repeated again. The resulting, very dilute, dispersion is charged to a standardized C. N. Wood Mfg. Co. Model 6200 Duophotometer and the weight average particle diameter (Dw) determined by light scattering (green light, wave length 4094 Å in water). The sample is then again diluted, as before, and the determination repeated. If the two Dw values do not differ by more than 100 Å, the Dw for the dispersion is taken as the average of those values. If the difference exceeds 100 Å, the sample ($\frac{1}{2}$ volume) is again diluted to volume and the Dw redetermined. If two of the three values differ by less than 100 A, they are averaged. If not, the procedure is repeated with another drop of the dispersion. The photometer is standardized against a uniform, monodisperse, polystyrene latex (10% solids) of a predetermined Dw and standard deviation. Such standard latices are manufactured by Dow Chemical U.S.A., Midland, Mich.

EXAMPLE 18

Integrity of Cured, TEA-neutralized, DER ®-667/1 phr $H_3PO_4$ Coatings to Acid, Alcohol and Water at Sterilization Temperatures.

Separate portions of a 50 wt. % dispersion of a TEA-neutralized DER ®-667/1 phr $H_3PO_4$ reaction product (prepared essentially in the manner of Run 2, Table 17, Example 16) were formulated to a solids level of 35.7% each with CYMEL®-303 (successively greater amounts), 10% aqueous triethanolamine, hexyl Cellosolve, DOWANOL®-EB and water.

Coated panels were prepared with each formulation as follows. A 12"×4.5"×0.015" stainless steel panel was cleaned with methylene chloride and coated on one side with a No. 18 wire wound rod (average coating wt. 5.37 mg solids per in²), dried 30 minutes at room temperature, coated and dried the same way on the reverse side and baked 3.5 minutes at 200° C.

The panels were edge-trimmed to 4"×11.5"×0.015" and (each) cut into twenty-four 1.25"×1.25"×0.15" squares and eight 0.25"×1.25"×0.15" strips, for a total coated surface area of 80 in². The pieces were put in 4 ounce, wide-mouth jars, adjacent pieces being separated by small TEFLON ® platelets. The jars were charged with 80 milliliters of the extraction test liquid, covered with upside-down crystallizing dishes and heated at the extraction temperature for the test period. The bottles were then sampled for TEA analysis (by ion chromatography), sealed with TEFLON®-lined screw caps and placed in a 125° C. oven to equilibrate. 50 gram aliquots were withdrawn after 7 and 8 days, analyzed for TEA and evaporated in tared dishes to determine their total contents of dissolved solids. Each test was run in parallel with an otherwise identically treated but uncoated control panel. The integrity and adherence of the cured coatings was checked by rubbing one of the cut squares (after being subjected to the extraction test) with acetone, in the conventional manner.

The formulations tested are given in Table 20 and the results in Table 21.

TABLE 20

| | WEIGHT - GRAMS | | | | | | |
|---|---|---|---|---|---|---|---|
| Form. (1) | Resin Dispersion | CYMEL® 303 | 10% aq. Triethanol Amine | Hexyl Cellosolye | DOWANOL® EB[2] | Deionized $H_2O$ | Wt. %[3] CYMEL® |
| 1 | 47.96 | 1.25 | 0.13 | 4.0 | 4.0 | 12.66 | 5.0 |
| 2 | 46.67 | 1.88 | 0.19 | 4.0 | 4.0 | 13.26 | 7.5 |

TABLE 20-continued

| | | | WEIGHT - GRAMS | | | | |
|---|---|---|---|---|---|---|---|
| Form.(1) | Resin Dispersion | CYMEL® 303 | 10% aq. Triethanol Amine | Hexyl Cellosolve | DOWANOL® EB(2) | Deionized H₂O | Wt. %(3) CYMEL® |
| 3 | 46.04 | 2.19 | 0.22 | 4.0 | 4.0 | 13.55 | 8.75 |
| 4 | 45.40 | 2.50 | 0.25 | 4.0 | 4.0 | 13.85 | 10.0 |
| 6 | 37.75 | 6.25 | 0.63 | 4.0 | 4.0 | 17.37 | 25.0 |

NOTES:
(1)Formulation.
(2)2-butoxyethanol.
(3)Wt. % of Total Solids.

TABLE 21

EXTRACTABLES IN CURED COATINGS OF TEA-NEUTRALIZED
DER®-667/1 phr H₃PO₄ ON STAINLESS STEEL

| Test | Form.(1) | Temp. | Extraction Time | Liquid | ppb TEA(2) After 8 Days | Solids(4) After 8 Days | Acetone Resistance Double Rubs To Failure |
|---|---|---|---|---|---|---|---|
| A | 2 | 160° F. | 2 hrs. | 8% aq. EtOH | ND(3) | ND(3) | >100 |
| B | 1 | 212° F. | " | 3% aq. HOAc | 231 | 0.059 | 10 |
| | 3 | | | | 26 | 0.012 | >100 |
| | 4 | | | | ND | ND | " |
| C | 6 | 250° F. | 2 hrs. | H₂O | " | 0.05 | " |

NOTES:
(1)Formulation (Table 20)
(2)Parts Triethylamine Extracted per Billion Parts Coating.
(3)Non-detectible by Method Calibrated to Accuracy of ±15 Parts per Billion.
(4)mg Solids Extracted per in² of Coating.

EXAMPLE 19

Effect on Substrate Wetting of Substituent on Phenol Used to Cap DGEBA Resin.

DER®-664 was separately reacted with 0.5 molecular proportion each of phenol, p-t-butylphenol and p-nonylphenol per equivalent of oxirane. One gram mole of the phenol reactant, 0.3 gram of A-1 catalyst (ethyl triphenyl phosphonium acetate) and 15 milliliters of xylene were added to 250 grams (0.13 g moles) of molten (~120° C.) DER®-664 and the mixture heated, with stirring, to 200° C. and refluxed until the EEW was approximately equal to the sum of the molecular weight of the phenol and twice the initial EEW of the resin. The xylene was stripped off, a retain sample taken and an equal weight of MEK stirred into the residual, capped resin.

The resulting solution was heated to reflux (80° C.) and 0.5 mole of H₃PO₄ (as the 85% aq. acid) was diluted with an equal weight of MEK and added dropwise. Refluxing was continued until the EEW was about 60,000 or remained constant. The approximate phr H₃PO₄ and P—OH/oxirane values for the three capped resins were as follows:

| Phenol from which resin derived | phr | P-OH/Oxirane |
|---|---|---|
| Phenol | 14 | 9 |
| p-(t-Butyl)phenol | 12 | 8 |
| p-Nonylphenol | 10 | 7 |

The solution was cooled, neutralized with 1 mole of triethylamine, diluted with water and stripped with stirring under reduced pressure at 70° C. until no more MEK came off. The stripped product was a stable aqueous dispersion containing (by analysis) approximately 50 wt. % solids. Portions of the dispersion were diluted to 30, 35 and 40 wt. % solids with water.

Brookfield RVT viscosities were determined for each of the four dispersion (12, total), using a #4 spindle at 100 rpm. Surface tensions were measured (average of 5 replicates each) with a Fisher Surface Tensiomat using a 5.990 cm diam. wire circle.

The wetting abilities of the different dispersions on three types of substrates were judged by putting a small amount of each of the dispersions to be compared on the same panel, drawing them simultaneously in parallel with a 190 18 wire wound rod and observing the resultant film strips for continuity, "crawling", spreading or shrinking, "beading", "fish eyes" and evenness. Overall ratings of from 1 (best) to 3 (poorest) were assigned, on the basis of the foregoing visual criteria, within each set.

pH's were checked for all of the dispersions and found to be consistently within the range of 8.45–8.55.

The results of the viscosity, surface tension and wetting evaluations are given in Table 22.

It is apparent from Table 22 that the wetting ability goes down as $R^5$ (in formula (p)) goes from nonyl to t-butyl to H, the differences being most pronounced (at 35 or 40% solids) on a clean aluminum substrate and least pronounced (at 30% solids) on uncleaned cold-rolled steel. These effects roughly correlate with the somewhat higher viscosities and lower surface tensions of the nonylphenolderived dispersion.

TABLE 22

| Substrate | % Solids in Disp. | Viscosity cps | | | Surf. Tension Dynes/cm | | | Relative Wetting Ability of Resin Capped With | | |
|---|---|---|---|---|---|---|---|---|---|---|
| | | NP(1) | BP(2) | P(3) | NP | BP | P | NP | BP | P |
| Aluminum | 30 | 13 | 12 | 11 | 46 | 50.8 | 46 | 1 | 3 | 3 |

TABLE 22-continued

| Substrate | % Solids in Disp. | Viscosity cps | | | Surf. Tension Dynes/cm | | | Relative Wetting Ability of Resin Capped With | | |
|---|---|---|---|---|---|---|---|---|---|---|
| | | NP[1] | BP[2] | P[3] | NP | BP | P | NP | BP | P |
| (CH$_2$Cl$_2$-cleaned) | | | | | | | (est) | 50% area covered | beads | beads |
| | 35 | 20 | 20 | 20 | 46.5 | 50 | 54 | 1 wets | 2 slight crawl | 3 severe crawl |
| | 40 | 39 | 30 | 30 | 50.8 | 50 | 53.3 | 1 wets | 2 moderate crawl | 3 severe crawl |
| Tin-free steel (cleaned) | 40 | 39 | 30 | 30 | 50.8 | 50 | 53.3 | 1 crawl | 2 puddles | 3 large beads |
| Cold-rolled steel (not cleaned) | 30 | 13 | 12 | 11 | 46 | 50.8 | 53.3 | 1 slight crawl | 2 moderate crawl | 3 more crawl |

NOTES:
[1] Nonyl phenyl reacted with DER ®-664 to final EEW 2220;
[2] t-Butyl phenol reacted with DER ®-664 to final EEW 2150;
[3] Phenol reacted with DER ®-664 to final EEW 2094.

EXAMPLE 20

Effects of EEW on composition and properties of reaction products of DGEBA-type resins and 1 phr H$_3$PO$_4$; also, effects of CH$_2$Cl$_2$ content in medium from which neutralized product is dispersed in water.

A series of seven DGEBA-type resins having EEW's ranging from 1231 to 3447 were prepared and analyzed for water content. Each resin was reacted 4 hours at 115°–120° C. and 80 psig with 1 phr H$_3$PO$_4$, essentially in the manner of runs E-G, part B, Example 17, except that the differences in water content for the seven reaction mixtures were not significantly large and the reaction medium included CH$_2$Cl$_2$ in two cases. The unneutralized product resins were analyzed by the extraction method for free acid and ester contents. The viscosities (Gardner-Holdt) of the latter resins (as 40% solutions in DOWAND ®-EB solvent) were also determined. The reaction products were neutralized and dispersed in water from CH$_2$Cl$_2$/acetone solutions containing from 20 to 30.6% by wt. of CH$_2$Cl$_2$ and the weight average particle diameters of the resulting dispersions determined by light scattering.

The dispersions were prepared as follows. An amount of esterification mixture containing about 50 grams of solids is weighed into a three-necked, round-bottom flask and acetone is added as necessary to adjust the solution to 50 wt. % solids. Next, 25 phr of CH$_2$Cl$_2$ and then the triethylamine are stirred in (using a magnetic stirrer) for fifteen minutes. 50 ml of water is added, with stirring (~600 rpm) at a uniform rate over a period of about 3 minutes.

No effect on particle size was observed when the procedure was varied to raise the final content of solids (derived from the 1746 EEW resin) as high as 55 wt. %.

The dispersions were not stripped of solvents before the particle size determinations were carried out, since it has been found that this is not necessary and that stripping would not result in destabilization of the dispersion.

The results are given in Table 23 following. It will be seen that: (1) all of the products gave mean dispersed particle sizes less than 2200 Å when neutralized and dispersed from CH$_3$Cl$_2$/acetone solutions having CH$_2$Cl$_2$ contents of 27% or less; (2) mean particle sizes less than 1900 Å were attained at CH$_2$Cl$_2$ contents of ~31 wt. % or less for all products except those derived from the 3447 EEW resin; and (3) mean sizes less than 1700 A were attained at CH$_2$Cl$_2$ contents of ~31 wt. % or less for the products derived from the 1231, 1742, 1991 and 2453 EEW resins (depending on the equivalents of base (TEA) employed per equivalent of P-OH and/or the mode of base addition). The fact that the product derived from the 1231 EEW resin was dispersible (from CH$_2$Cl$_2$/acetone) in water, even though it contained 9.5 times as many glycol as monoester groups, is noteworthy. So also is the essentially regular drop in glycol to monoester ratio as the molecular weight (approx. 2×EEW) of the starting resin goes up. This is consistent with the results noted in Example 8 (where the P-OH to oxirane ratio was several times higher).

At constant phr's of H$_3$PO$_4$ and water, higher EEW's result in lower diester and higher free acid contents— even though the P-OH/oxirane ratio is higher. This is most noticeable at EEW's greater than 2500. The maximum diester content and minimum free acid content (corresponding to high reaction mixture viscosities) occur sooner with lower EEW resins. However, the equilibrium ester content (after 4 hours at 115° C.) is not substantially affected by EEW.

Within an EEW range of 1200–2000, the size of the neutralized product particles in the dispersion (from acetone) goes down as the EEW goes up.

The preferred EEW range (for mean particle sizes below 2000 Å) is from about 1400 to about 2500.

TABLE 23

EFFECTS OF EEW AND DISPERSION MEDIUM COMPOSITION ON ESTERIFICATION PRODUCT COMPOSITION, VISCOSITY AND MEAN PARTICLE SIZE, WHEN NEUTRALIZED AND DISPERSED IN WATER

| DGEBA Resin[2] EEW | P-OH Oxirane | $CH_2Cl_2$/DMK[1] Wt. Ratio Reaction Medium | $CH_2Cl_2$/DMK[1] Wt. Ratio Dispersion Medium | Total % $H_2O$ in Volatiles | REACTION PRODUCT WITH 1 phr $H_3PO_4$ m mols/g solids Free $H_3PO_4$ | Mono-ester | Di-ester | Glycol[5] Mono-ratio | Viscosity cps | DISPERSION[4] Moles TEA Per Mol $H_3PO_4$[7] | Mean Particle Size |
|---|---|---|---|---|---|---|---|---|---|---|---|
| 1231 | .38 | 0/100 | 20/80 | 0.53 | .0186 | .0759 | .0075 | 9.51 | 171 | 3 | 2160Å |
|  |  |  | 28/72 |  |  |  |  |  |  |  | 1430 |
| 1397 | .43 | 0/100 | 20/80 | 0.43 | .0194 | .0731 | .0095 | 8.52 | 293 | 3 | 1855 |
| 1602 | .49 | 0/100 | 20/80 | 0.53 | .0198 | .0768 | .0054 | 6.99 | 143 | 3 | 1855 |
| 1742 | .53 | 0/100 | 20/80 | 0.41 | .0170 | .0760 | .0090 | 6.32 | 812 | 3 | 1920 |
|  |  |  | 31/69 |  |  |  |  |  |  | 3 | 1230 |
|  |  |  | 31/69 |  |  |  |  |  |  | 3[7] | 1740 |
| 1991 | .61 | 0/100 | 20/80 | 0.39 | .0201 | .0745 | .0074 | 5.53 | 668 | 3 | 1370 |
|  |  |  | 0/100 |  |  |  |  |  |  | 3 | 2050 |
|  |  |  | 20/80 |  |  |  |  |  |  | 2 | 2180 |
| 2453 | .75 | 27/73 | 27/73 | 0.48 | .0148 | .0840 | .0032 | 3.78 | 989 | 3 | 1650 |
| 3447 | 1.06 | 27/73 |  | 0.54 | 0.209 | .0775 | .0036 | 2.65 | 2683 | 3 | 2160 |

NOTES:
[1] Acetone;
[2] 500 grams used in each reaction;
[3] 500 grams in each reaction mixture, except only 444 grams (total) in last two;
[4] 50% solids, in water;
[5] equivalents of oxirane converted to glycol groups calculated as equivalents charged − (equiv. to mono- and diesters);
[6] charged to reaction;
[7] 2 equiv. added initially + 1 equiv. after dispersion formed.

Films were drawn on tin-free steel coupons from formulations (below) of the dispersions (mean particle sizes 1680 Å and 2280 Å, respectively) derived from the 2453 and 3447 EEW resins. After being cured two minutes at 200° C., the films were evaluated, with the results given in Table 24, following. The adhesion failure and blush observed in the boiling water test with the film derived from the higher EEW resin is attributed to the relatively high content of free acid in the unneutralized esterification product. The excess acid of course could be removed by extraction, prior to neutralization.

The composition of each formulation was: 27.6 wt. % resin, 2.4% CYMEL ®-303 (treated with 0.1% of its weight of triethanolamine), 9.3% hexyl carbitol and 60.7% water.

TABLE 24

| EEW of DGEBA resin | 2453 | 3447 |
|---|---|---|
| Mean particle size Å | 1680 | 2280 |
| m moles $H_3PO_4$/g solids[1] | 0.0148 | 0.0209 |
| Wedge Bend Failure | 33% | 36% |
| 30 min. boiling $H_2O$ |  |  |
| Blush | very slight | slight to moderate |
| Adhesion | pass | pass |
| Acetone Double Rubs | >100 | >100 |

NOTE:
[1] In unneutralized esterification product.

Product compositions versus water-thinnability

Gel Permeation Chromatographic analysis has shown that only very minor amounts, if any, of oxirane are consumed by reactions other than with water or P-OH groups and essentially no triester groups are formed (unless the activity of water in the reaction mixture is very low). Also, only minor amounts, if any, of polyfunctional diesters (esters in which an epoxide molecule is linked through phosphodiester groups to more than one other epoxide molecule) are produced in the reaction unless the reaction medium comprises about 75 wt. % or more of a solvent like dichloromethane.

It is evident from the data given in the foregoing examples that glycol group formation results not only from ester hydrolysis; direct reaction of water with (protonated) oxiranes also proceeds to a limited extent, although more significantly at higher reaction temperatures and when more dilute $H_3PO_4$ is used. Also, direct esterification of alcoholic hydroxyl groups present as such in $E^1$ (or formed upon P-OH/oxirane adduction) has a small effect on the total content of phosphomonoester groups in the final product (after, say, 3-6 hours reaction time).

It is particularly surprising that solubilization (water-thinnability) of resins such as DER ®-667 can be achieved by a reaction in which up to about 88% (Example 17-B) of the oxirane groups are converted to glycol groups, rather than to acidic, salt-forming groups. DGEBA resins are already polyfunctional in alcoholic hydroxyl groups, but are nevertheless distinctly hydrophobic. Conversion of, on an average, one oxirane per molecule to a glycol group would not be expected to noticeably decrease the overall hydrophobicity of the molecule. Furthermore, conversion of the remaining oxirane groups (somewhat less than one per molecule, on the average) to alpha-hydroxy phosphomonoester groups would not appear to provide enough salt (neutralized) groups to result in solubilization. Yet, the facts are that the oxirane groups in the resins are converted almost entirely to glycol and (mono) ester groups and that even at an average content of substantially less than one monoester group per molecule, the neutralized products derived from $E^1$ resins having EEW's up to about 3200 can be converted to aqueous dispersions which do not include more than incidental amounts of organic solvents. In fact, it is believed that DGEBA resins having EEW's as high as 5500 can be made so water-dispersible by the present process.

The product will retain its essential character even if it additionally contains an amount of phosphodiester groups (each deriveable from reaction of a molecule of phosphoric acid with an oxirane group in each of two different epoxide molecules) in an amount such as to account for up to about 10 percent of the phosphorous present therein. At some stages of the process of the present invention, higher proportions of diester groups may be present, but such groups tend to hydrolyze to monoester and glycol groups. Even at room temperature, this hydrolysis reaction will generally continue (so long as any water is present) until little if any diester groups remain. Since neutralization is usually carried out in the presence of water, the content of diester groups thereafter will ordinarily be very low anyway.

When an acid/epoxide reaction product containing a relatively large amount of free phosphoric acid is neutralized, particularly with an inorganic base, the amount of free acid-derived salt present in the neutralized product may be such that the dispersibility of the salified resin in what, in effect, is a brine, rather than in water, becomes a consideration. However, there are obvious expedients for avoiding this problem and in any case the amount of base in the neutralized product will be at least the sum of that consumed by the free acid, and whatever amount is required to salify enough ester P—OH moieties to render the resin molecules dispersible in water.

It is apparent, from Example 14 herein, that the utility of the presnt invention may be indirectly extended to DGEBA type epoxides having EEW's as high as 13,000! That is, resins of the latter type, such as DER ®-684, which do not yield water-thinnable products when reacted with phosphoric acid and neutralized, may nevertheless be co-dispersed (as such or as esterified resins) with (neutralized) reaction products of the present invention, in water.

On the basis of some experiments not detailed herein, it has been found that the products derived from DGEBA resins having EEW's an order of magnitude lower than DER ®-667 are not effective dispersants for DER ®-684. However, essentially all of the neutralized products of the invention are apparently capable of dispersing substantial proportions of unconverted DGEBA molecules of at least as high an EEW as those the neutralized products are derived from. That is, the data of Tables 1, 3-6 and 18 show that neutralized products of the invention in which up to about 54% of the charged oxirane groups remain unconverted can be dispersed in water and give useful coatings. Assuming a statistical distribution of the unconverted oxirane groups in the resin molecules, it is apparent that substantial proportions of molecules having all of their original oxiranes intact are present in such products.

Thus, compositions of the present invention as defined earlier herein (see summary of the invention) additionally may comprise molecules of formula (a) in which both oxiranes are intact or one of them is intact and the other is replaced by a glycol or vicinal-hydroxy phosphomonoester group, the average molecular weight of said molecules being not more than about 10 times the average molecular weight of those molecules of formula (a) in which both oxiranes have been replaced by glycol or vicinal-hydroxyester groups. (A typical ratio of EEW's for DER ®-684 and DER ®-667 is 13,000/1550 or ~8.4.)

The proportion of such oxirane-containing molecules present may be as much as to provide about one oxirane per glycol or ester group in the composition. That is, the number of oxirane groups may be as high as the total number of glycol and beta-hydroxy phosphomonoester groups.

What is claimed is:

1. A process for making water-thinnable, base-neutralized, acidic resins which are convertible to hydrophobic, high performance, thermoset resins, said process comprising:
(I) reacting orthophosphoric acid with a polyether epoxide resin $E^1$ consisting essentially of molecules of the formula

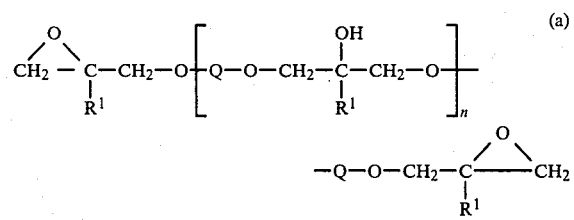

or

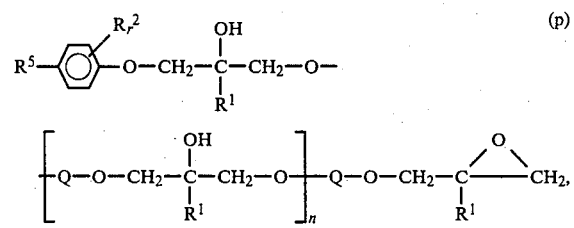

wherein
Q, independently, in each occurrence, is

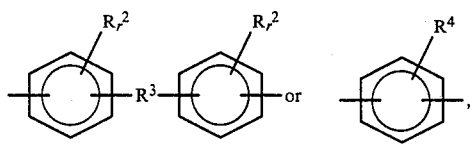

n is an integer of from 0 to 40, r is zero, 1 or 2 and, independently in each occurrence;
$R^1$ is H, methyl or ethyl,
$R^2$ is —Br, —Cl or a $C_1$ to $C_4$ alkyl or alkenyl group,
$R^3$ is a $C_1$-$C_4$ alkylene or alkenylene group,
$>C(CF_3)_2$, —CO—, —SO$_2$—, —S—, —O— or a valence bond,
$R^4$ is —Br, —Cl or a $C_1$ to $C_4$ alkyl or alkenyl group; and
$R^5$ is H or alkyl of 1 to 12 carbons,
said reaction being carried out by contacting $E^1$ with an orthophosphoric acid source material and from 0 to about 25 molecular proportions of water per molecular proportion of $H_3PO_4$ provided by said source material, until the fraction of the oxirane groups in $E^1$ converted is such that when the resulting product is at least partially salified with a base, an aqueous dispersion which contains essentially no co-solvents or dispersing agents can be formed from it,
the amount of orthophosphoric acid included as such in said source material, or obtainable therefrom by hydrolysis, being such as to provide from about 0.3 to about 2.8 P-OH hydroxyl groups per oxirane group, and
(II) salifying the resultant reaction product with at least sufficient of a base to render it water-thinnable.

2. The process of claim 1 wherein Q in each occurrence is

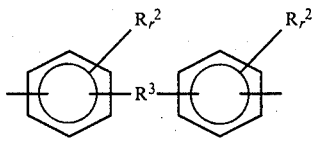

and r, $R^2$ and $R^3$ are as defined in claim 1.

3. The process of claim 2 in which Q, in essentially all occurrences, is either

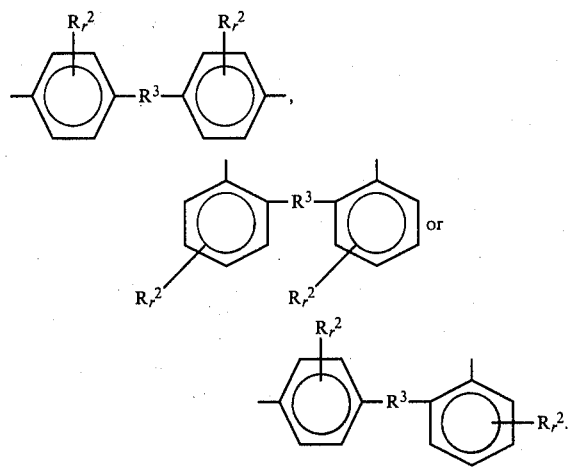

4. The process of claim 3 in which r is zero and $R^3$ is $(CH_3)_2C<$.

5. The process of claim 4 in which the average value of n is within the range of from about 10 to about 13.

6. The process of claim 1 in which the phosphoric acid is charged to the reaction as aqueous orthophosphoric acid, of a concentration within the range of from about 70 to about 90%, and in an amount such as to provide from about 0.4 to about 1 P-OH hydroxyls per oxirane group, and water is not otherwise charged to the reaction.

7. The process of claim 1 wherein dioxane, methyl ethyl ketone, acetone or a mixture of dichloromethane with acetone containing 27 wt. % or less of dichloromethane is employed as a medium for the acid/epoxide reaction.

8. The process of claim 7 in which the medium is methyl ethyl ketone or acetone and contains from 0 to about 10 weight percent of water.

9. The process of claim 8 in which the medium is a mixture of dichloromethane and acetone in a weight ratio within the range of from about 20/80 to about 27/73.

10. The process of claim 1 in which said reaction is carried out in an inert medium, ammonia or a volatile amine and water are added to the resulting reaction mixture and the medium is essentially removed, thereby forming said aqueous dispersion.

11. The process of claim 10 in which a medium for the reaction other than methyl ethyl ketone is employed and the residue left after removal of said medium is stirred with enough methyl ethyl ketone to dissolve it and the resulting solution is then stripped of methyl ethyl ketone to yield a stable aqueous dispersion of the amine salt of the acid/epoxide reaction product.

12. The process of claim 1 additionally comprising employing as said base a fugitive base, water-thinning the resulting product and applying it as an aqueous coating on a substrate, heating to effect removal of the water and the base and curing the resultant dehydrated, desalified coating.

13. The process of claim 1 in which said base is an amine of the formula $NR_3$, wherein each R is H, methyl or ethyl independently, except that not more than one R is H.

14. The process of claim 13 in which said amine is triethylamine, dimethylamine, trimethyl amine or diethylamine.

15. The process of claim 14 in which said amine is triethyl amine.

16. The process of claim 4 in which:
(1) the reaction is carried out in a medium which is acetone, methyl ethyl ketone or a mixture of acetone and dichloromethane containing about 20 to 27 wt. % of dichloromethane;
(2) the phosphoric acid source material is 85% aqueous $H_3PO_4$, which is charged to the reaction in an amount of from about 0.8 to about 1.0 parts by weight per hundred parts of $E^1$;
(3) the reactant mixture is heated to a temperature within the range of from about 110° to about 120° C. and maintained within that range until 0.5% or less of the oxirane groups originally present in $E^1$ have not been consumed,
(4) the resulting reaction mixture is neutralized with at least 3 moles of triethylamine per mole of said $H_3PO_4$, diluted with water and stripped of said medium to a final kettle temperature of about 150° C. or less, and
(5) $E^1$ is of formula (a), wherein n has a value of from about 10 to about 23.

17. A coating composition which is an aqueous dispersion of a phosphate resin and, exclusive of curing agents, comprises:
(A) as an essential film-forming component therein, said phosphate resin, each molecule of which is deriveable by conversion of 1,2-glycol- or betahydroxyphosphomonester groups of the oxirane groups in an epoxide represented by formula (a) or formula (p) in claim 1 and having an EEW within the range of from about 172 to about 5500, the number ratio of said glycol groups to said monoester groups in said molecules being within the range from 0 to about 12;
(B) from 0 to 85 parts of unesterified phosphoric acid ($H_3PO_4$) per 100 parts by weight of said resin molecules,
(C) a base, in such amount that at least enough of said monoester groups are salified thereby to render said resin molecules dispersible in water, and
(D) water
said number ratio and the amount of B being such that said composition need not include any co-solvents or dispersing agents in order to exist as said dispersion.

18. The composition of claim 17 which comprises essentially no co-solvents or dispersing agents.

19. The composition of claim 17 wherein Q in said epoxide molecules is as defined in claim 2.

20. The composition of claim 19 wherein said epoxide molecules are as defined in claim 4.

21. The composition of claim 20 wherein said epoxide molecules are as defined in claim 5.

22. The composition of claim 17 wherein said base is a fugitive base.

23. The composition of claim 22 wherein said base is an amine as defined in claim 13.

24. The composition of claim 23 wherein said amine is triethylamine, dimethylamine, trimethylamine or diethylamine.

25. The composition of claim 24 wherein said amine is triethylamine.

26. The composition of claim 21 wherein said base is triethylamine.

27. The composition of claim 17 in which said resin molecules constitute essentially all of the film forming components present therein.

28. The composition of claim 18 in which essentially all of said resin molecules are deriveable from epoxide molecules of formula (a) and said composition additionally comprises molecules of formula (a) in which both oxiranes are intact or one oxirane is intact and the other is replaced by a 1,2-glycol group or a 2-hydroxy phosphomonoester group, the average molecular weight of the latter said molecules being not more than about 10 times the average molecular weight of said resin molecules of formula (a) in which each oxirane has been replaced by a 1,2-glycol or beta-hydroxy phosphomonoester group, the proportion of said oxirane-containing molecules present in said composition being such that the ratio of oxirane groups to the total number of said glycol and ester groups is about 1 or less.

29. The composition of claim 28 wherein, in essentially all of said molecules, Q is as defined in claim 3 and n is within the range of from about 10 to about 90.

30. The process of claim 1 additionally comprising converting the salified reaction product to an aqueous dispersion thereof which contains essentially no co-solvents or dispersing agents.

31. The composition of claim 17, when applied as a film or coating on a substrate.

32. The process of claim 5 in which the amount of $H_3PO_4$ provided by said acid source material is about 1 part by weight per hundred parts of $E^1$.

33. The composition of claim 17 wherein said epoxide is of said formula (p).

34. The coating of claim 31, in which said composition is heat-convertible and is dehydrated, desalified and cured in place on said substrate, by heating.

* * * * *

UNITED STATES PATENT AND TRADEMARK OFFICE
CERTIFICATE OF CORRECTION

PATENT NO. : 4,289,812

DATED : Sept. 15, 1981

INVENTOR(S) : Patrick H. Martin

It is certified that error appears in the above—identified patent and that said Letters Patent is hereby corrected as shown below:

Column 3, line 61, delete "point" and insert -- product --;

Column 7, line 62, delete "found" and insert -- formed --;

Column 9, line 64, after "formula" insert -- given --;

Column 10, Table A, in the heading, "Value of n" should be placed under "Theoretical" and "or" should be under "cps @25°C.";

Column 12, lines 33-34, replace the formula with:

Column 12, line 50, delete "represents" and insert -- represented --;

Column 13, line 12, delete "particle" and insert -- partial --;

UNITED STATES PATENT AND TRADEMARK OFFICE
CERTIFICATE OF CORRECTION

PATENT NO. : 4,289,812
DATED : Sept. 15, 1981
INVENTOR(S) : Patrick H. Martin

It is certified that error appears in the above—identified patent and that said Letters Patent is hereby corrected as shown below:

Column 19, line 48, delete "reaction" and insert -- reactive --;

Column 22, line 13, delete "in" and insert -- is --;

Column 23, line 34, delete "size" and insert -- sized --;

Column 25, line 37, delete "ER" and insert -- DER --;

Column 25, line 48, delete "ER" and insert -- DER --;

Column 25, line 54, first word should be -- was --, instead of "as";

Column 26, line 60, "acetone" is misspelled;

Column 29. Table 4-continued, under the heading "Milliequiv. Hydrolyzed Oxirane", the 7th number, "31.2" should be deleted and replaced with -- 37.2 --;

Column 29, Table 5, the first heading should be -- Starting Resin --;

UNITED STATES PATENT AND TRADEMARK OFFICE
CERTIFICATE OF CORRECTION

PATENT NO. : 4,289,812

DATED : Sept. 15, 1981

INVENTOR(S) : Patrick H. Martin

It is certified that error appears in the above—identified patent and that said Letters Patent is hereby corrected as shown below:

Column 32, line 55, delete "was" and insert -- were --;

Column 33, Table 8, delete "DGR" in the second line of the heading and replace with -- DER --;

Column 33, Table 8, in the last line the word "monoester" is misspelled;

Column 34, line 23, "monoester" is misspelled;

Column 34, Table 10, the heading "Oxirane Converted" should read -- % Oxirane Converted --;

Column 35, line 35, a closing parenthesis should be added after "(100%";

Column 36, Table 11-I, Footnote (1), the closing parenthesis of "(0.75)" should be deleted;

Column 38, Table 11-II, in the first line of the heading delete "677" and insert -- 667 --;

UNITED STATES PATENT AND TRADEMARK OFFICE
CERTIFICATE OF CORRECTION

PATENT NO. : 4,289,812
DATED : Sept. 15, 1981
INVENTOR(S) : Patrick H. Martin

It is certified that error appears in the above-identified patent and that said Letters Patent is hereby corrected as shown below:

Column 38, Table 11-II, in the second line of the heading a slash should be placed between "$CH_2Cl_2$" and "Acetone";

Column 46, Table 18, the first number in the eighth column, "0.90", should be deleted and -- 0.96 -- inserted;

Column 48, Table 19, under the second part "1746", column titled "5", the first number, ".0150$^{(3)}$" should be deleted and -- .0160$^{(3)}$ -- should be inserted;

Column 49, line 60, the first word "A" should be -- Å --;

Column 50, Table 20, in the fifth column of the heading, the second line, the word "Cellosolye" should be deleted and -- Cellosolve -- inserted;

Column 51, Table 20-continued, the same change as immediately above should be made;

UNITED STATES PATENT AND TRADEMARK OFFICE
CERTIFICATE OF CORRECTION

PATENT NO. : 4,289,812

DATED : Sept. 15, 1981

INVENTOR(S) : Patrick H. Martin

It is certified that error appears in the above—identified patent and that said Letters Patent is hereby corrected as shown below:

Column 52, line 38, "dispersion" should be plural;

Column 52, line 46, delete "190" and insert -- # --;

Column 54, line 41, delete "A" and insert -- $\overset{\circ}{A}$ --;

Column 55, Table 23, the heading "Reaction Medium" should have a footnote -- (3) -- reference;

Column 55, Table 23, in the last line of the Table, fourth column -- 27/73 -- should be inserted and the numbers following should all be tabulated one column over.

Column 60, line 40, delete "of" and insert -- to --.

Signed and Sealed this

Sixteenth Day of February 1982

[SEAL]

Attest:

GERALD J. MOSSINGHOFF

Attesting Officer

Commissioner of Patents and Trademarks